US006494462B2

(12) United States Patent
Dietle

(10) Patent No.: US 6,494,462 B2
(45) Date of Patent: Dec. 17, 2002

(54) ROTARY SEAL WITH IMPROVED DYNAMIC INTERFACE

(75) Inventor: Lannie L. Dietle, Sugar Land, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 0 days.

(21) Appl. No.: 09/558,907

(22) Filed: Apr. 26, 2000

(65) Prior Publication Data

US 2002/0163138 A1 Nov. 7, 2002

Related U.S. Application Data

(63) Continuation-in-part of application No. 09/073,410, filed on May 6, 1998
(60) Provisional application No. 60/131,435, filed on Apr. 26, 1999.

(51) Int. Cl.[7] ................................ F16J 15/32
(52) U.S. Cl. .................... 277/549; 277/551; 277/560; 277/559
(58) Field of Search .................... 277/549, 551, 277/560, 559, 584

(56) References Cited

U.S. PATENT DOCUMENTS

| 3,744,805 A | 7/1973 | Heinrich |
| 4,288,083 A | 9/1981 | Braconier |
| 4,484,753 A | 11/1984 | Kalsi |

(List continued on next page.)

FOREIGN PATENT DOCUMENTS

| EP | 0030085 | 6/1981 |
| EP | 0860351 | 8/1998 |
| GB | 499.480 | 1/1939 |
| WO | WO 9837347 | 8/1998 |

OTHER PUBLICATIONS

"Kalsi Seals Rotary Shaft Seal Catalog," Kalsi Engineering, Inc., Dec. 1, 1993.
Kalsi, M.S., et al. "A Novel High–Pressure Rotary Shaft Seal Faciliaties Innovations in Drilling and Production Equipment.", SPE #37627, 1997.
Langford, J., and Kalsi, M.S. "A New Hydrodynamically Lubricated Bearing Seal for Improving Rock Bit Performance." pp 1–8, vol. 27, Drilling Technology Symposium, American Society of Mechanical Engineers, Book No. G00508–1990.
Ayala, Hugo M., et al. "Seal Design for Reduced Wear in Abrasive Slurries", pp 1–17, FEDSM97–3446; Fluids Engineering Division Summer Meeting, American Society of mechanical Engineers, Ju. 22–26, 1997.

(List continued on next page.)

*Primary Examiner*—Anthony Knight
*Assistant Examiner*—Enoch E Peavey
(74) *Attorney, Agent, or Firm*—James L. Jackson; Andrews & Kurth LLP

(57) ABSTRACT

A hydrodynamic seal for location in a seal groove of a structure, such as a housing and for dynamic sealing engagement with a relatively rotatable surface. Elevated contact pressure zones caused by pressure manipulation features located at least partially on the dynamic sealing surface of the seal provide for controlled lubricant movement within the dynamic sealing interface between the seal and the relatively rotatable surface for enhanced lubrication of the seal even when the seal defines a wide sealing footprint with the relatively rotatable surface. The pressure manipulation feature may be defined by projections at least partially from the dynamic sealing lip which are compressed against the relatively rotatable surface or depressions which define pressure manipulating edges which react with the lubricant in the dynamic sealing interface responsive to relative rotation. The projections or depressions may be of elongate form and may be oriented in skewed relation with respect to the direction of relative rotation.

31 Claims, 7 Drawing Sheets

U.S. PATENT DOCUMENTS

| | | |
|---|---|---|
| 4,610,319 A | 9/1986 | Kalsi |
| 4,619,534 A | 10/1986 | Daly et al. |
| 5,024,364 A | 6/1991 | Nash |
| 5,139,275 A | 8/1992 | Ehrmann et al. |
| 5,195,757 A | 3/1993 | Dahll |
| 5,230,520 A | 7/1993 | Dietle et al. |
| 5,678,829 A | 10/1997 | Kalsi et al. |
| 5,711,534 A | 1/1998 | Bengoa et al. |
| 5,738,358 A | 4/1998 | Kalsi et al. |
| 5,763,956 A | 6/1998 | Metz et al. |
| 5,823,541 A | 10/1998 | Dietel et al. |
| 5,873,576 A | 2/1999 | Dietle et al. |
| 5,915,696 A | 6/1999 | Onuma et al. |
| 6,007,105 A | 12/1999 | Dietle et al. |
| 6,036,192 A | 3/2000 | Dietle et al. |

OTHER PUBLICATIONS

Ayala, Hugo M., et al. "Wear of Elastomeric Seals in Abrasive Slurries," pp 9–21, Wear 220 (1998) Elsevier Science S.A., Aug. 28, 1997.

Kalsi, M.S., et al. "Feasibility Study of a Slated O–Ring as a High Pressure Rotary Seal" ASME Paper No. 72–WA/DE–14(1972).

Kalsi, M.S. Elastohydrodynamic Lubrication of Offset O–Ring Rotary Seal, ASME Transactions, Journal of Lubrication Technology, vol. 103; Paper 80–C2/Lub–7, American Society of Mechanical Engineers, Jul. 1981. ASME Paper No. 80–C2/Lub–7 (1980).

Horve, Leslie A. "Shaft Seals for Dynamic Applications", pp. 338–339; Marcel Dekker, Inc., 1996.

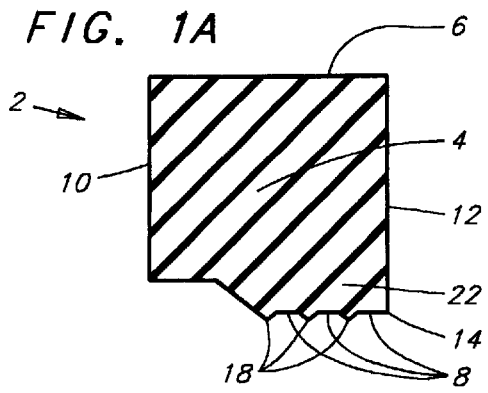
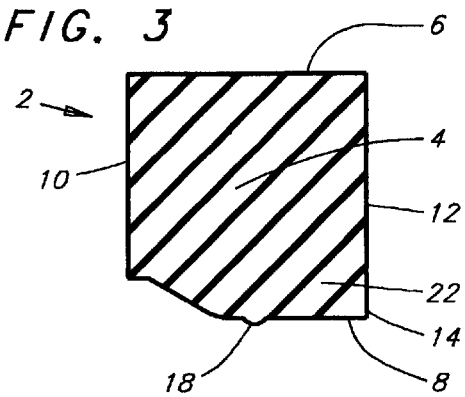
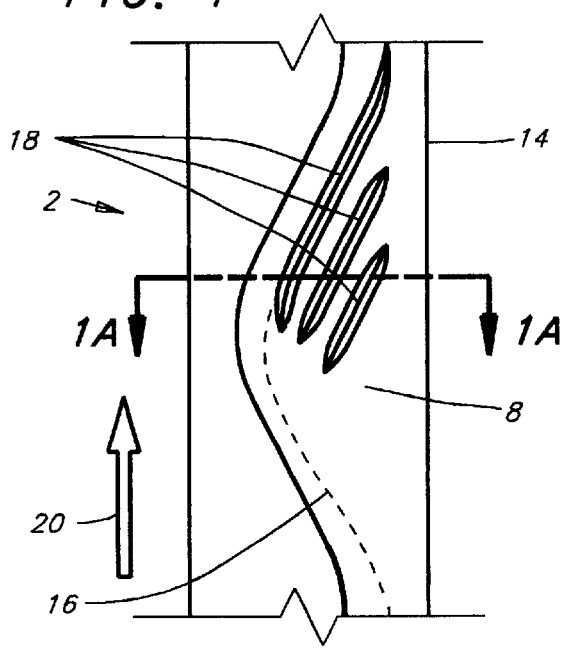
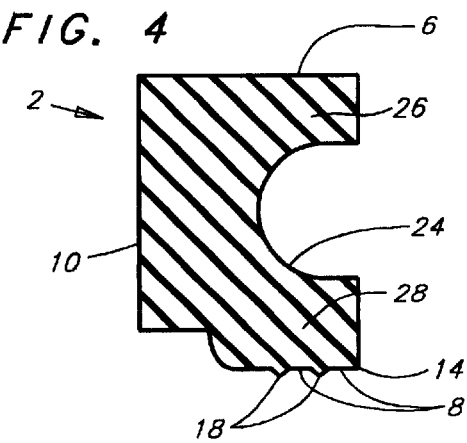
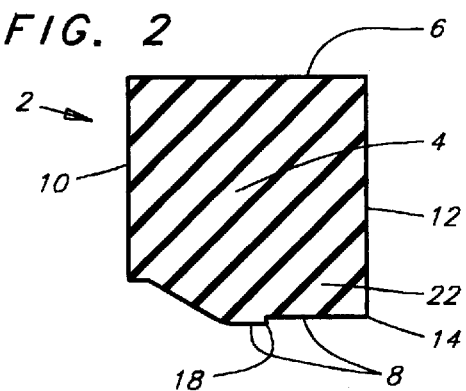
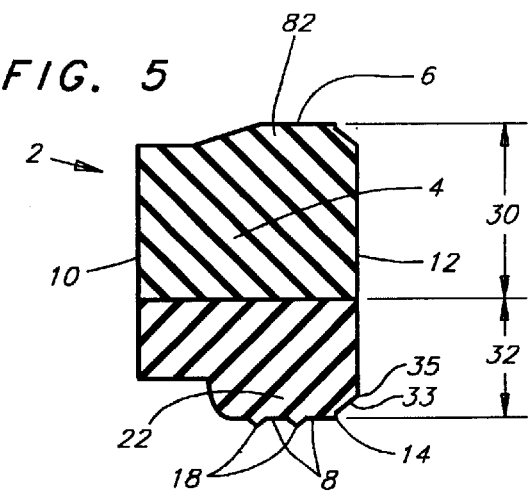

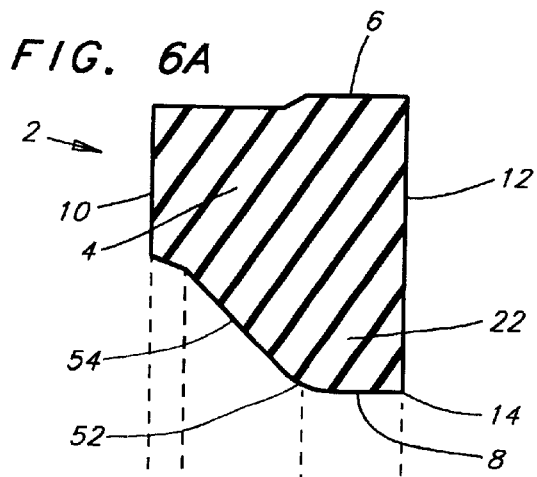
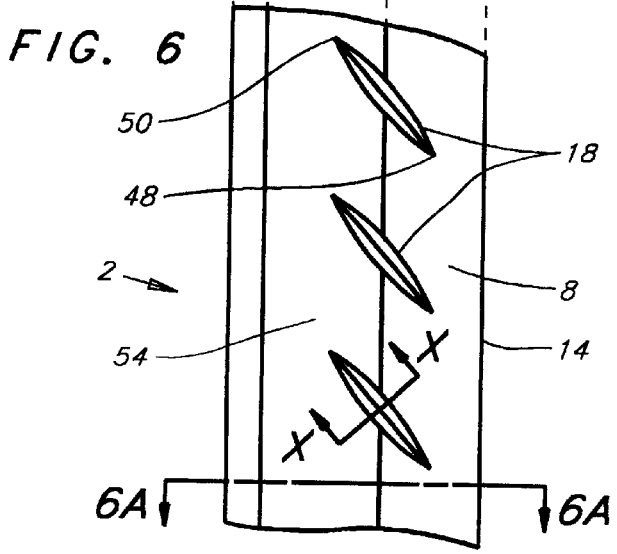
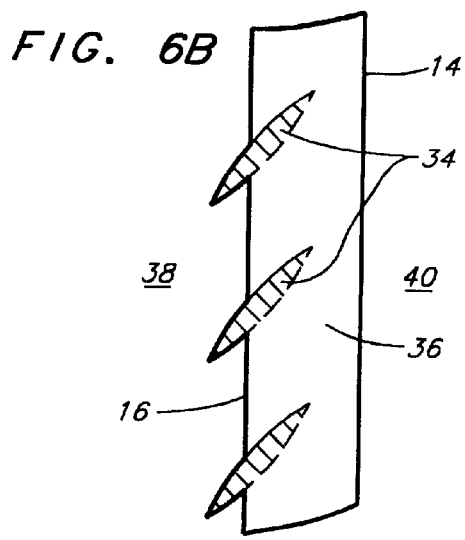
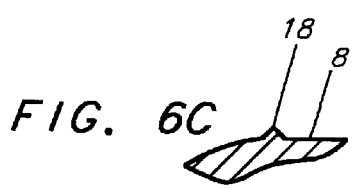
FIG. 6C
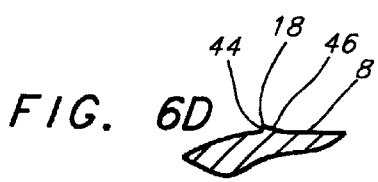
FIG. 6D
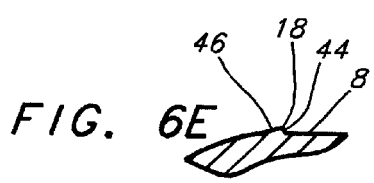
FIG. 6E
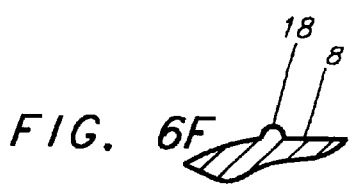
FIG. 6F
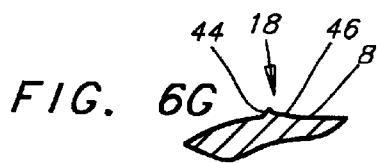
FIG. 6G

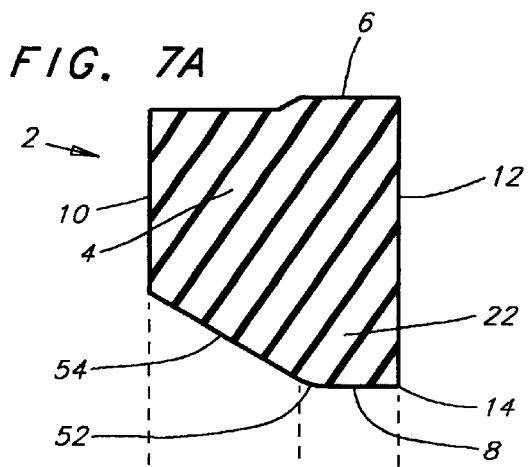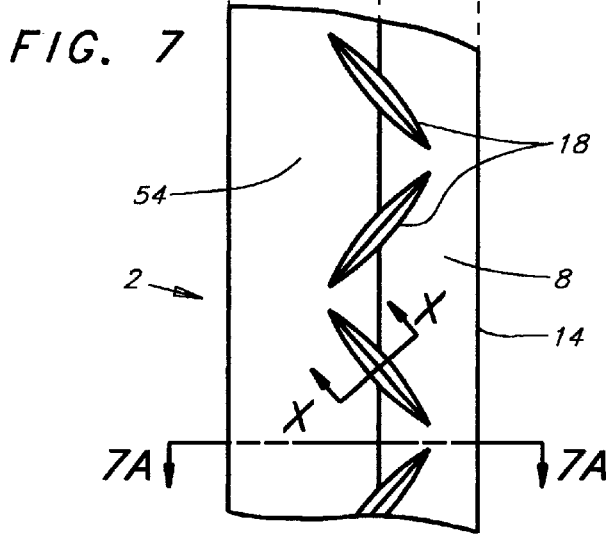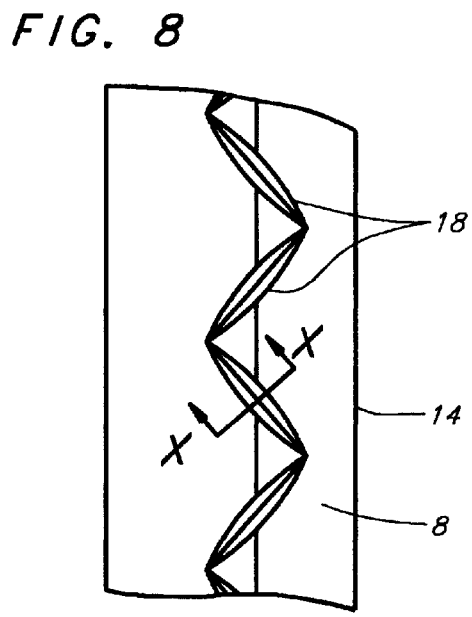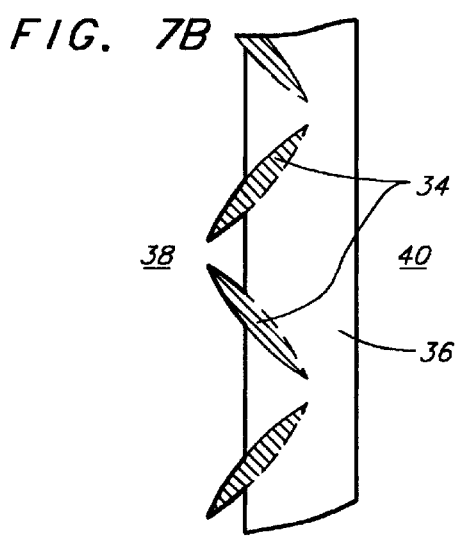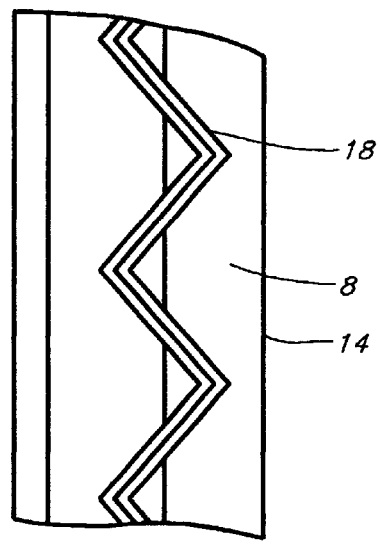

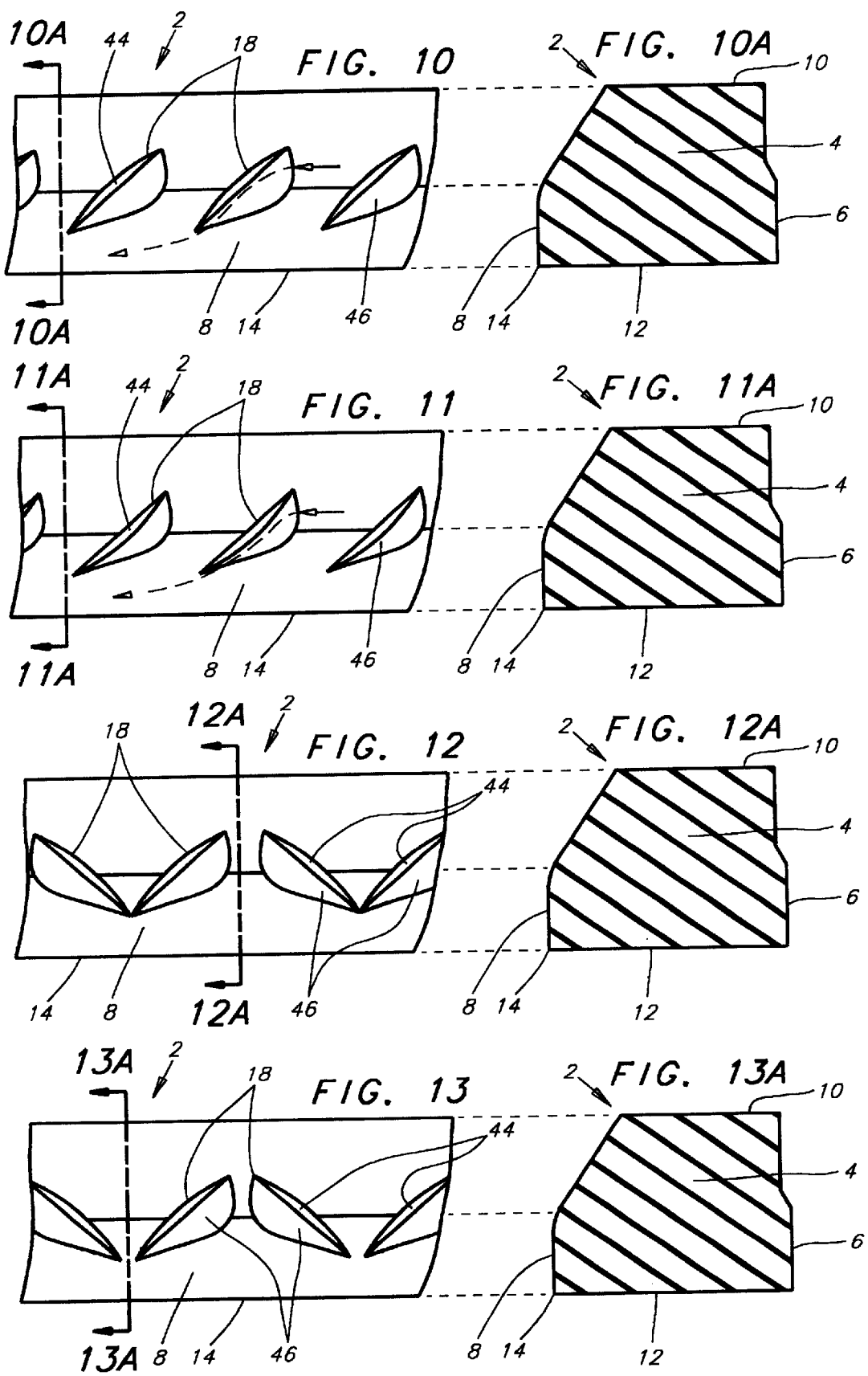

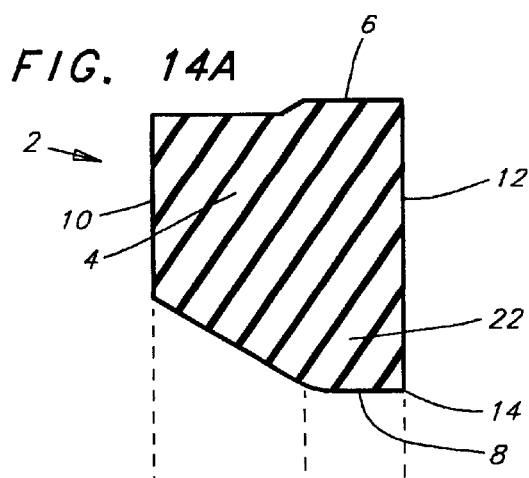
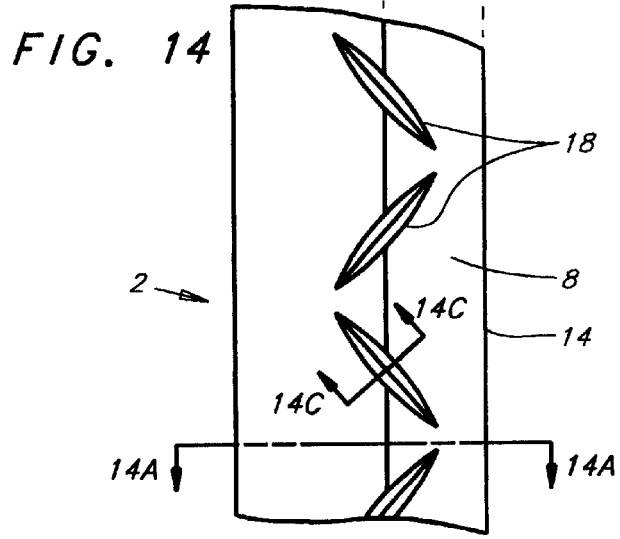
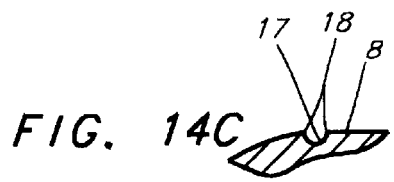
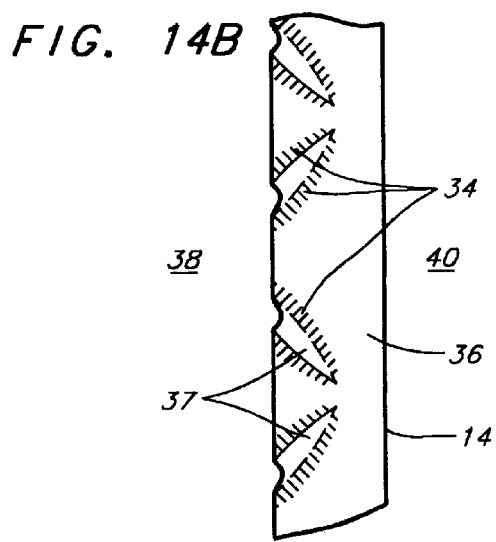

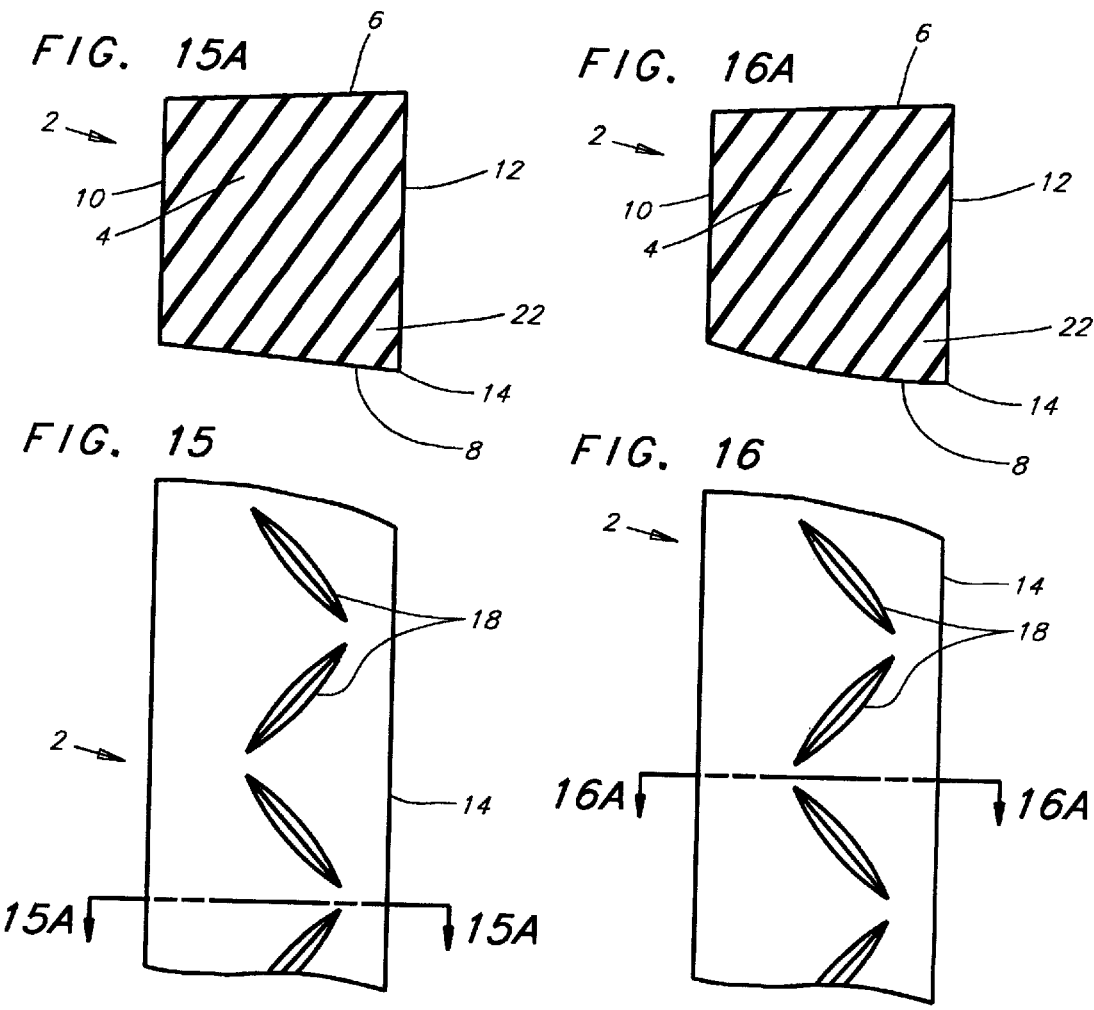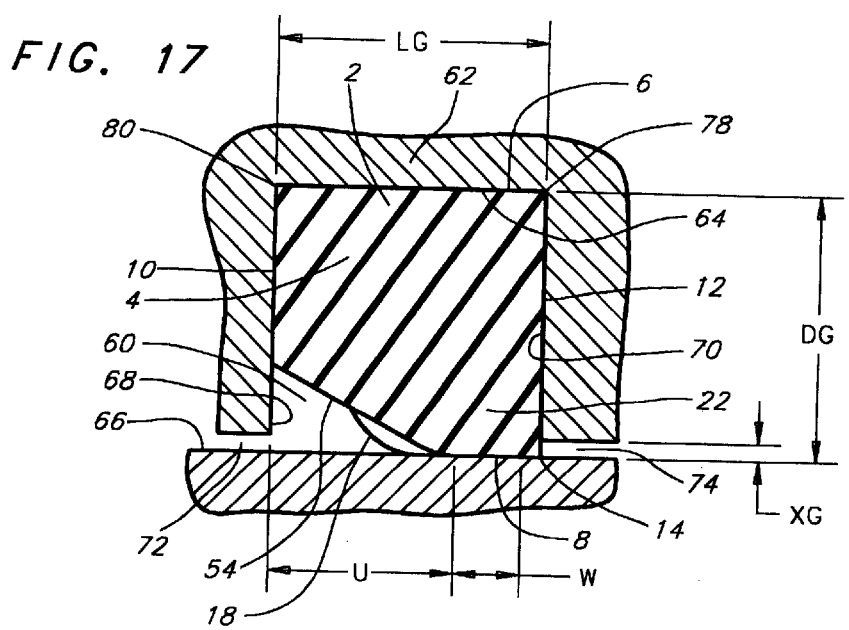

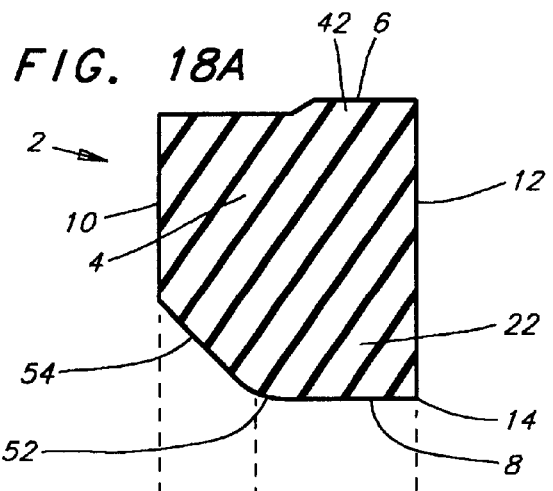
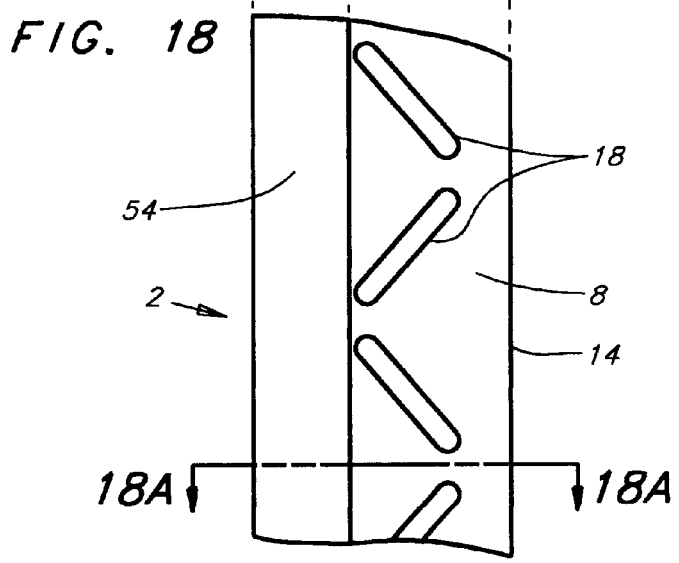
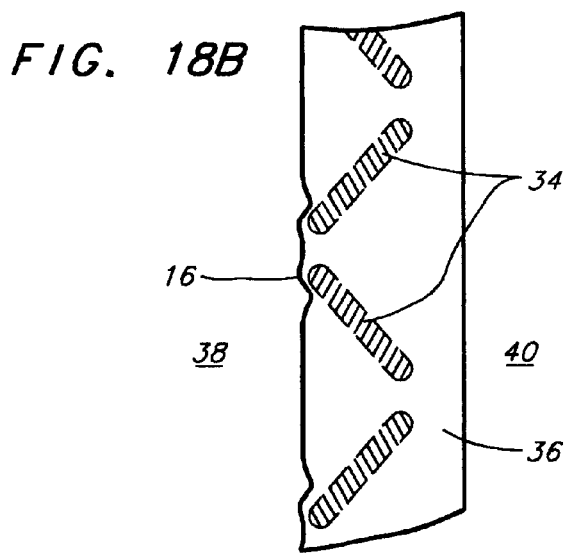

ROTARY SEAL WITH IMPROVED DYNAMIC INTERFACE

This is a continuation-in-part of utility application Ser. No. 09/073,410 filed on May 6, 1998 by Lannie Dietle and entitled "Rotary Seal With Enhanced Lubrication And Contaminant Flushing". Portions of this invention were made with government support under contract no. DE-AC03-90ER80939 awarded by the Department of Energy. The government has certain rights in this invention. Applicant hereby claims the benefit of U.S. Provisional Application Serial No. 60/131,435 filed on Apr. 26, 1999 by William T. Conroy, Lannie L. Dietle, Jeffrey D. Gobeli, and Manmohan S. Kalsi and entitled "Improved Skew-Resisting Hydrodynamic Seal", which provisional application is incorporated herein by reference for all purposes.

BACKGROUND OF THE INVENTION

1. Field of the Invention

This invention relates generally to rotary seals for establishing sealing between a structure and a relatively rotatable surface for lubricant retention and environment exclusion. More particularly the present invention relates to resilient rotary shaft seals having geometry for manipulating interfacial contact pressure within the dynamic sealing interface to interact with lubricant during rotation of a relatively rotatable surface for the purpose of enhancing lubricant film thickness across the sealing interface and for causing lubricant movement toward the environment for ensuring adequate lubrication of the entire dynamic sealing surface to extend the service life thereof, and having geometry that provides for resistance to becoming skewed or twisted within the seal groove, thereby minimizing skew-induced wear caused by impingement of abrasive contaminants present in the environment.

2. Description of the Prior Art

The prior-art hydrodynamically lubricated rotary seal designs of U.S. Pat. Nos. 4,610,319, 5,230,520, 5,678,829, 5,738,358, 5,873,576 and 6,036,192 are known in the industry by the registered trademark "Kalsi Seals", and pertain to seals that are typically used to partition a lubricant from an environment and hydrodynamically lubricate the dynamic sealing interface in response to rotation of a mating shaft.

Commercial seals are presently being manufactured and sold under U.S. Pat. Nos. 4,610,319, 5,230,520, 5,678,829, 5,738,358, all of which employ a dynamic sealing lip defining a dynamic sealing surface. The dynamic sealing lip has angulated hydrodynamic waves on its lubricant side for hydrodynamically wedging lubricant into the dynamic sealing interface, and has an abrupt exclusion edge on its environment side for excluding the environment, per the teachings of U.S. Pat. No. 4,610,319. The waves cause the dynamic sealing lip to have a variable thickness, being thinnest at the low point of the waves, and being thickest at the high point of the waves.

The lubricant film in the dynamic sealing interface is thin, and not uniform in thickness across the width of the dynamic sealing interface. The resulting lubrication of the dynamic sealing surface is uneven, and surface asperity contact and resulting rubbing wear sometimes occurs between the dynamic sealing surface and the shaft. The greatest film thickness occurs toward the lubricant side of the dynamic sealing interface, and the least occurs toward the environment side.

The angulated hydrodynamic waves cause the lubricant-side edge of the dynamic sealing surface to have a series of waves; this edge is sometimes called the wavy hydrodynamic edge. Film thickness and resulting lubrication of the dynamic sealing surface is greatest in the region of the waves because a large portion of the lubricant wedged into the dynamic sealing interface at the leading edges of the waves simply leaks out at the trailing edges, and only a much smaller portion travels toward the abrupt exclusion edge. As a result, the environment-side of the dynamic sealing surface is less well lubricated than the lubricant side, and more prone to wear and overheating.

If the lubricant is at higher pressure than the environment, the seal begins to bulge or protrude in to the extrusion gap between the seal housing and the shaft due to bending, shear and other stresses in the dynamic sealing lip caused by the pressure; this phenomenon is called "extrusion" by the seal industry. These stresses are highest at the thinnest points of the dynamic sealing lip; i.e. the low point of the waves.

Extrusion can lead to damage known as "nibbling" or "extrusion damage", which is caused by cyclic stressing of the material protruding into the extrusion gap, causing it to fatigue and break away from the sealing element. The cyclic stress is typically caused by dynamic fluctuations in the size of the extrusion gap due to lateral shaft motion, causing high variations in the compression of any protruding material.

Localized extrusion damage promotes abrasive ingestion, and can also partially interrupt the hydrodynamic film causing the seal to run hotter and suffer premature compression set and surface embrittlement. Extrusion damage, and wear damage caused by environmental abrasives, can progressively destroy the dynamic sealing surface, beginning at the abrupt exclusion edge and progressively working toward the low point of the waves. Once the damage reaches the low point of the waves, the seal no longer blocks the leakage path, and fails.

Because the dynamic sealing lip has variable thickness, the seals have less than perfect compressive stability and can become locally twisted and skewed, especially when the pressure of the lubricant and the environment is substantially balanced. U.S. Pat. Nos. 5,230,520, 5,873,576 and 6,036,192 are directed at improving compressed stability.

The seal is radially compressed when installed, which also causes circumferential compression, which is effectively increased by thermal expansion. Since the seal circumference is relatively long compared to the seal cross-section, circumferential compression can cause buckling in a manner similar to the classic textbook example of a long, slender structural column under compressive loading. (Lubricant pressure can be used to prevent buckling.) Twisting related to lip width variation can help to initiate such buckling, which can cause the abrupt exclusion edge to acquire a skewed position. This can promote abrasive wear, particularly if the lubricant end of the seal is twisted toward the shaft at the location of skew, causing interfacial contact pressure to increase near the wavy hydrodynamic edge and decrease near the abrupt exclusion edge, which diminishes hydrodynamic lubrication and environmental exclusion.

Since there is more material at the thickest point of the dynamic sealing lip, when one attempts to axially constrain prior art seals to help control skew-induced wear, part of the differential thermal expansion between the seal and the housing is relieved circumferentially, causing material displacement from the thickest point of the lip to the thinnest point of the lip, thereby diminishing hydrodynamic lubrication. Elevated environment pressure can worsen the problem, apparently by causing higher contact pressure near the wavy hydrodynamic edge.

Testing has shown that prior art seals perform better when the lubricant pressure is higher than the environment pressure. When the environment pressure is higher than the lubricant pressure, the prior art dynamic sealing lip deforms unevenly due to its varying width, causing the environment-side edge to become non-circular and more prone to abrasion by the environment.

U.S. Pat. No. 6,036,192, which has not yet been commercialized, discloses a skew and twist resistant rotary seal assembly comprising a structure having a circular seal groove having first and second spaced seal groove walls and a relatively rotatable surface, combined with a circular body of sealing material being located within said circular seal groove and having a part thereof projecting from said circular seal groove, with at least one circular dynamic sealing projection extending from said circular body of sealing material and having sealing engagement with said relatively rotatable surface; and a plurality of bearing elements projecting from said circular body of sealing material and being circumferentially distributed about said circular body of sealing material and having bearing engagement with said relatively rotatable surface.

The present invention builds on the technology disclosed in U.S. Pat. No. 6,036,192 to provide the "plurality of bearing elements" described therein with a configuration for providing elevated contact pressure zones of skewed configuration to improve lubricant distribution across the dynamic sealing interface.

SUMMARY OF THE INVENTION

The present invention is a resilient, generally ring shaped hydrodynamic rotary seal for partitioning a lubricant from an environment, and for hydrodynamically lubricating the dynamic sealing interface between the seal and a shaft. One object of the invention is improved exclusion-edge circularity compared to prior art, particularly when the environment pressure is higher than the lubricant pressure, and also when the lubricant and the environment are substantially equal in pressure. Another object of the invention improved distribution of lubricant across the dynamic sealing interface, compared to the prior art, by use of elevated contact pressure zones which may be skewed with respect to the direction of relative rotation. Another object of the invention is providing support against extrusion when the lubricant pressure is higher than the environment pressure. Another object of the invention is to provide a dynamic sealing surface and a dynamic sealing lip which are robust, providing sufficient width to both to be able to perform for long periods of time in high differential pressure applications and in applications having high concentrations of abrasives in the environment.

Circularity of the environment-side edge of the dynamic sealing interface is critical from an environment exclusion standpoint. In prior art compression-type hydrodynamic seals, such circularity has been difficult to achieve under some operating conditions due to assorted influences of the hydrodynamic wave shape. In the preferred embodiment of the present invention, improved environment-edge circularity is achieved by incorporating a dynamic sealing lip, which is substantially unvarying in width, thereby eliminating uneven deflection in response to pressure. The environment-side of the seal is configured to be supported by an environment side-gland wall when the lubricant pressure is higher than the environment. In applications where the lubricant pressure and environment pressure are substantially equal, the seal can be constrained by a seal groove to resist circumferential-compression-induced buckling and thereby assure environment-edge circularity. This invention, especially when implemented in an axially constrained manner, can provide improved environmental exclusion performance compared to the prior art discussed above.

In the present invention, elevated contact pressure zones caused by pressure manipulation features are used to provide improved lubricant distribution across the dynamic sealing interface. At least a portion of each of the pressure manipulation features is located on the dynamic sealing surface of the seal. The pressure manipulation features are also capable of initiating hydrodynamic lubrication, thereby eliminating the need for conventional hydrodynamic waves, thus allowing a substantially constant dynamic sealing lip width and dynamic sealing surface width.

The elevated contact pressure zones can be produced by various manner of pressure manipulation features, such as projecting rounded or pointed features, such as ledges, and such as recessed local depressions, all of which may elongated, and all of which may be skewed in relation to the direction of relative rotation.

The elevated contact pressure zones cause diversion of the lubricant film toward the environment. Some lubricant leaks past the elevated contact pressure zones, thereby assuring adequate lubrication thereof. The elevated contact pressure zones cause a net leakage of lubricant film into the environment.

This invention has application where relatively rotatable surfaces are sealed with respect to a structure with either the structure or the relatively rotatable surface, or both, being the rotary member. The dynamic sealing surface can be substantially radially oriented when the seal is compressed in the radial direction between substantially cylindrical counter-surfaces, with the dynamic sealing surface and the pressure manipulation features being located on either the inner or the outer periphery of the seal as required by the application.

Alternatively, the dynamic sealing surface can be substantially axially oriented when the seal is compressed in the axial direction between relatively rotating substantially planar counter-surfaces. In such face-sealing arrangements, the pressure manipulation features can be oriented to pump in an outward direction if the lubricant is located inward of the dynamic sealing surface, and can be oriented to pump in an inward direction if the lubricant is located outward of the dynamic sealing surface.

In this invention, hydrodynamic action can be created by means other than large molded-in waves so that (1) the dynamic lip is substantially the same strength and volume about it's circumference such that all portions of the lip deflect substantially equally under pressure induced from the environment side so that no hydrodynamics are introduced from the environment side as a function of differential pressure acting across the seal from the environment side, and (2) so that the hydrodynamic action is not substantially diminished by circumferential relief of differential thermal expansion.

The invention provides a method for establishing a sealed partition between an environment and a lubricant, comprising: (a) providing a seal having a generally ring-shaped body defining a dynamic sealing surface of generally circular configuration having a plurality of pressure manipulation features projecting therefrom; (b) providing a relatively rotatable surface having a direction of relative rotation relative to said dynamic sealing surface; and (c) compressing said dynamic sealing surface and said plurality of pressure manipulation features against said relatively rotatable surface, wherein: (i) said dynamic sealing surface establishing sealing contact pressure with said relatively rotatable surface, thereby establishing a dynamic sealing interface between said dynamic sealing surface and said relatively rotatable surface; (ii) said plurality of pressure manipulating features establishing at least one elevated contact pressure zone with said relatively rotatable surface being at a contact pressure that is higher than said sealing contact pressure; and (iii) said at least one elevated contact pressure zone being skewed with respect to said direction of relative rotation.

The invention also provides a method for controlling lubricant movement within a dynamic sealing interface between a generally ring-shaped seal and a relatively rotatable surface, wherein the seal establishes a partition between a lubricant and an environment and has a dynamic sealing surface establishing a dynamic sealing interface with the relatively rotatable surface and has a plurality of pressure manipulating features projecting from the dynamic sealing surface, said method comprising: (a) with said plurality of pressure manipulating features, collectively establishing at least one, and preferably a plurality of, elevated contact pressure zones with said relatively rotatable surface and within said dynamic sealing interface; and (b) with said elevated contact pressure zones, causing directionally controlled movement of lubricant within said dynamic sealing interface and toward the environment. It is preferred that the elevated contact pressure zones be skewed with respect to the direction of relative rotation. The above method can be further expanded further include having the seal and the relatively rotatable surface establish at least one direction of relative rotation, said plurality of pressure manipulating features being disposed in skewed relation with respect to said at least one direction of relative rotation, said method comprising: causing interaction of said plurality of pressure manipulating features with said lubricant within said dynamic sealing interface so that said skewed relation thereof develops said directionally controlled movement of lubricant responsive to relative rotation between said generally ring-shaped seal and said relatively rotatable surface.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate typical embodiments of this invention, and are therefore not to be considered limiting of its scope, for the invention may admit to other equally effective embodiments.

In the Drawings:

FIG. 1 is a fragmentary view showing a plurality of pressure manipulation features taking the form of skewed projections distributed across the dynamic sealing surface and being skewed relative to the direction of rotation;

FIG. 1A is a cross-sectional illustration taken at cutting plane 1A—1A of FIG. 1 showing the pressure manipulation features taking the form of a plurality of skewed projections distributed across dynamic sealing surface and being skewed relative to the direction of relative rotation;

FIG. 2 is a longitudinal cross-sectional view taken at a cutting plane which is aligned with the theoretical center-line thereof showing a pressure manipulation feature in the form of a skewed ledge;

FIG. 3 is a longitudinal cross-sectional illustration of a hydrodynamic seal representing an alternative embodiment of the present invention showing a pressure manipulation feature in the form of a skewed rounded projection, the longitudinal cross-section being taken along a line that is aligned with the theoretical center-line of the ring-like body of the seal;

FIG. 4 is a longitudinal cross-sectional illustration of a hydrodynamic seal representing an alternative embodiment of the present invention having an annular groove therein for interfacial contact pressure control and having a plurality of pressure manipulation features taking the form of skewed projections distributed across the dynamic sealing surface;

FIG. 5 is a longitudinal cross-sectional view of a dual modulus hydrodynamic seal of the present invention being taken at a cutting plane which is aligned with the theoretical center-line thereof and showing a plurality of pressure manipulation features taking the form of skewed projections distributed across the dynamic sealing surface;

FIG. 6 is a fragmentary elevational view of a hydrodynamic seal of the present invention being shown with skewed pressure manipulation features being located partly on the dynamic sealing surface of the seal;

FIG. 6A is a longitudinal sectional view taken along line 6A—6A of FIG. 6;

FIG. 6B is a fragmentary development view of the sealing interface of the seal shown in FIG. 6 and showing elevated contact pressure regions of the sealing interface between the seal and the relatively rotatable surface;

FIGS. 6C–6G are fragmentary sectional views taken along line X—X of FIG. 6 and collectively illustrating the geometry of the pressure manipulation features of the seal;

FIG. 7 is a fragmentary elevational view of a hydrodynamic seal of the present invention being shown with oppositely skewed pressure manipulation features being located partly on the dynamic sealing surface of the seal;

FIG. 7A is a longitudinal sectional view taken along line 7A—7A of FIG. 7;

FIG. 7B is a fragmentary development view of the sealing interface of the seal shown in FIG. 7 and showing elevated contact pressure regions of the sealing interface between the seal and the relatively rotatable surface;

FIG. 8 is a fragmentary elevational view of a hydrodynamic seal of the present invention being shown with oppositely skewed pressure manipulation features being located partly on the dynamic sealing surface of the seal and having ends thereof in contact with the ends of adjacent oppositely skewed pressure manipulation features to thus collectively define a substantially continuous skewed pressure manipulation shape;

FIG. 9 is a fragmentary elevational view of a hydrodynamic seal of the present invention being shown with a continuous pressure manipulation features having oppositely skewed sections and with portions thereof located on the dynamic sealing surface so as to be present within the dynamic sealing interface between the seal and the relatively rotatable surface;

FIG. 10 is a fragmentary elevational view of a hydrodynamic seal of the present invention for unidirectional rotation, being shown with skewed pressure manipulation features being located partly on the dynamic sealing surface of the seal and having a sharply sloped trailing edge and a leading edge defining a gentle slope;

FIG. 10A is a sectional view taken along line 10A—10A of FIG. 10;

FIG. 11 is a fragmentary elevational view of a hydrodynamic seal of the present invention being shown with skewed pressure manipulation features being located partly on the dynamic sealing surface of the seal and having a gentle sloped trailing edge and a leading edge defining a sharply defined slope;

FIG. 11A is a sectional view taken along line 11A—11A of FIG. 11;

FIG. 12 is a fragmentary elevational view of a hydrodynamic seal of the present invention for bi-directional rotation, being shown with oppositely skewed pressure manipulation features being located partly on the dynamic sealing surface of the seal and having a gentle sloped trailing edge and a leading edge defining a sharply defined slope;

FIG. 12A is a sectional view taken along line 12A—12A of FIG. 12;

FIG. 13 is a fragmentary elevational view of a hydrodynamic seal of the present invention for bi-directional rotation, being shown with oppositely skewed pressure manipulation features being located partly on the dynamic sealing surface of the seal and having a gentle sloped trailing edge and a leading edge defining a sharply defined slope;

FIG. 13A is a sectional view taken along line 13A—13A of FIG. 13;

FIG. 14 is a fragmentary elevational view of a hydrodynamic seal of the present invention being shown with spaced, oppositely skewed and alternately located recessed pressure manipulation features being located partly on the dynamic sealing surface of the seal;

FIG. 14A is a sectional view taken along line 14A—14A of FIG. 14;

FIG. 14B is a fragmentary development view of the sealing interface of the seal shown in FIG. 14 and showing elevated contact pressure regions of the sealing interface between the seal and the relatively rotatable surface;

FIG. 14C is a transverse sectional view taken along line 14C—14C of FIG. 14 and showing the geometry of the pressure manipulation features in greater detail;

FIG. 15 is a sectional view of a hydrodynamic seal of the present invention having pressure manipulation features being superposed on a dynamic sealing surface of substantially conical configuration;

FIG. 16 is a sectional view of a hydrodynamic seal of the present invention having pressure manipulation features being superposed on a dynamic sealing surface of curved configuration;

FIG. 17 a fragmentary cross-sectional illustration of a seal assembly having a structure defining a seal groove, a relatively rotatable surface and a hydrodynamic seal of the present invention being shown positioned by the circular seal groove and establishing sealing within a circular seal gland;

FIG. 18 is a fragmentary elevational view of a hydrodynamic seal of the present invention being shown with skewed pressure manipulation features being located entirely within the dynamic sealing surface of the seal;

FIG. 18A is a longitudinal sectional view taken along line 18A—18A of FIG. 18;

FIG. 18B is a fragmentary development view of the sealing interface of the seal shown in FIG. 18 and showing elevated contact pressure regions of the sealing interface between the seal and the relatively rotatable surface.

Discussion of FIGS. 1–1C

FIG. 1 is a fragmentary view of an uncompressed seal 2 which is a hydrodynamic seal having a generally ring-shaped-body 4 which is preferably solid, and defines a theoretical center-line, and FIG. 1A is a longitudinal cross-sectional illustration thereof taken at cutting plane 1A—1A of FIG. 1 which is aligned with said theoretical center-line.

In FIG. 1, dynamic sealing surface 8 is illustrated as the seal would appear if the diameter of dynamic sealing surface 8 were quite large so that curvature does not cause significant curvature foreshortening of circumferential lengths.

Seal 2 may be composed of any suitable sealing material, including elastomeric or rubber-like materials and various polymeric materials and may be of monolithic or integral, one piece construction as shown. Seal 2 may also incorporate different materials bonded together to form a composite structure, per the teachings of U.S. Pat. No. 5,738,358, commonly assigned herewith. (As shown in FIG. 5.)

Seal 2 is designed to be located by a circular seal groove provided by a machine structure, said seal groove being defined by a first groove wall, a peripheral groove wall, and a second groove wall, and is designed to partition a lubricant supply from an environment. (For example, see FIG. 17.) Seal 2 is further designed to be compressed between the peripheral groove wall and a relatively rotatable surface that is in spaced relation to the structure. A static sealing surface 6 is provided for establishing compressed sealed relation with the peripheral groove wall, and a dynamic sealing surface 8 is provided for establishing compressed sealed relation with the relatively rotatable surface. Static sealing surface 6 and dynamic sealing surface 8 may be in generally opposed relation as shown. Seal 2 defines a first seal body end 10 for facing the first groove wall and for being oriented toward a lubricant supply, and defines a second seal body end 12 for facing the second seal groove wall, and for being oriented toward an environment. The dynamic sealing surface 8 defines a exclusion edge 14, which is preferably circular and may be of an abrupt configuration, as shown, for improved exclusion performance. The dynamic sealing surface 8 defines lubricant-side edge 16, which may optionally be pre-molded to be wavy as shown per the teachings of commonly assigned U.S. Pat. No. 4,610,319, for introducing lubricant into the dynamic sealing interface between the seal 2 and the relatively rotatable surface. Seal 2 also defines a plurality of pressure manipulation features 18 that, when compressed against the relatively rotatable surface, produce elevated contact pressure zones within the dynamic sealing interface between the seal 2 and the relatively rotatable surface to distribute lubricant across the dynamic sealing interface toward exclusion edge 14. The elevated contact pressure zones cause diversion of the lubricant film toward the environment producing a strong diverting action which pumps lubricant across the dynamic sealing interface toward the environment. Some of the lubricant leaks past the elevated contact pressure zones, thereby assuring adequate lubrication thereof. The elevated contact pressure zones cause a net leakage of the film of lubricant from the sealing interface into the environment.

The pressure manipulation features 18 are intellectually related to the teachings of a "plurality of bearing elements" in commonly assigned U.S. Pat. No. 6,036,192, except that in this invention they are preferably skewed in relation to the direction of relative rotation 20, and may be elongated as shown, thereby producing the preferred skewed elevated contact pressure zones of the present invention.

It is an object of the present invention that at least a portion of each of the pressure manipulation features 18 be located within the region of the dynamic sealing surface 8 so that at least a portion of the elevated contact pressure zones are located within the dynamic sealing interface, and as shown by FIG. 1, the pressure manipulation features 18 may effectively be located entirely within the region of the dynamic sealing surface 8 such that the elevated contact pressure zones may effectively be located entirely within the dynamic sealing interface. In FIG. 1 and 1A, a lubricant-side edge 16 having waves is provided, but such waves are not necessary because it has been determined that the pressure manipulation features are capable of initiating hydrodynamic lubrication by themselves, thereby eliminating the need for conventional hydrodynamic waves, and thereby allowing a substantially constant width of dynamic sealing surface 8, as will be discussed further in conjunction with subsequent figures.

The elevated contact pressure zones can be produced by various manner of pressure manipulation features, such as the skewed projecting substantially pointed ridges of FIGS. 1 and 1A, or such as skewed recessed grooves, rounded projections, or ledges, which are discussed in conjunction with other figures herein. As shown in FIG. 1A, the seal of the present invention may, if desired, incorporate a dynamic sealing lip 22 projecting from said generally ring-shaped-body 4 and defining said dynamic sealing surface 8 and said pressure manipulation features 18.

In the seal of FIGS. 1–1A, the static sealing surface 6 and the dynamic sealing surface 8 can be substantially cylindrical if desired, for radial sealing applications where the peripheral groove wall and the relatively rotatable surface are substantially cylindrical and the generally ring-shaped-body 4 is radially compressed between them; in such cases first seal body end 10 and second seal body end 12 can be substantially planar if desired, and the first groove wall and second groove wall can be substantially planar if desired.

Alternately, the static sealing surface 6 and the dynamic sealing surface 8 can be substantially axially oriented if desired, for axial (face) sealing applications where peripheral the peripheral groove wall and the relatively rotatable surface are substantially planar and the generally ring-shaped-body 4 is axially compressed between them; in such cases first seal body end 10 and second seal body end 12 can be substantially cylindrical if desired, and the first groove wall and second groove wall can be substantially cylindrical if desired. Seal grooves for hydrodynamic seals have been thoroughly described in the prior art of commonly assigned U.S. Pat. Nos. 5,230,520, 5,678,829, 5,738,358, 5,873,576 and 6,036,192, and therefore for the sake of brevity are not illustrated here, except in FIG. 17.

In the case of relatively large diameter seals, dynamic sealing surface 8 can simply be manufactured as an internally oriented cylindrical surface configured for sealing against a relatively rotatable surface defining an externally oriented cylindrical surface. The cross-section of a large diameter seal is torsionally limp, and can be twisted 180 degrees so that dynamic sealing surface 8 can become an externally oriented cylindrical surface configured for sealing against a relatively rotatable surface being an internally oriented cylindrical surface, or twisted 90 degrees so that dynamic sealing surface 8 becomes an axially oriented surface configured for sealing against a relatively rotatable surface of planar form. The relative torsional stiffness of small diameter seals is higher, making twisting less practical, and it is preferred that dynamic sealing surface 8 be pre-oriented in the required radial or axial orientation at the time of manufacture when small diameter seals are made.

Discussion of FIG. 2

FIG. 2 is a longitudinal cross-sectional illustration of a seal 2 of the present invention taken at a cutting plane which is aligned with the theoretical center-line of the generally ring-shaped-body 4. Seal 2 is designed to be located by a substantially circular seal groove, said seal groove being defined by a first groove wall, a peripheral groove wall, and a second groove wall, and is designed to partition a lubricant from an environment. Seal 2 is further designed to be compressed between the peripheral groove wall and a relatively rotatable surface. A static sealing surface 6 is provided for establishing compressed sealed relation with the peripheral groove wall, and a dynamic sealing surface 8 is provided for establishing compressed sealed relation with the relatively rotatable surface. Seal 2 defines a first seal body end 10 for facing the first groove wall and for being oriented toward a lubricant supply, and defines a second seal body end 12 for facing the second seal groove wall, and for being oriented toward an environment. The dynamic sealing surface 8 defines a exclusion edge 14, which is preferably circular and abrupt for excluding the environment. Seal 2 also defines at least one pressure manipulation feature 18 that is preferably skewed relative to the direction of relative rotation and preferably defines a plurality of pressure manipulation feature 18 that, when compressed against the relatively rotatable surface, collectively produce at least one skewed elevated contact pressure zone within the dynamic sealing interface between the seal 2 and the relatively rotatable surface to distribute lubricant across the dynamic sealing interface toward exclusion edge 14. In FIG. 2 the pressure manipulation feature 18 takes the form of at least one step or ledge being skewed in relation to the relative rotation direction.

At least a portion of the at least one pressure manipulation feature 18 is located within the region of the dynamic sealing surface 8. As described above and shown in conjunction with FIG. 1, the at least one pressure manipulation feature 18 may be located entirely within the region of the dynamic sealing surface 8. The lubricant-side edge 16 of the seal of FIG. 2 can be either wavy or unwavy, for the reasons discussed in conjunction with the seal of FIG. 1 and 1A, but is preferred to be unwavy. The seal of FIG. 2 can be oriented for radial or face sealing, just as discussed in conjunction with the seal of FIG. 1 and 1A. The seal of FIG. 2 may, if desired, incorporate a dynamic sealing lip 22 projecting from said generally ring-shaped-body 4 and defining said dynamic sealing surface 8 and said at least one pressure manipulation feature 18.

Discussion of FIG. 3

FIG. 3 is a longitudinal cross-sectional illustration of a seal 2 of the present invention taken at a cutting plane which is aligned with the theoretical center-line of the generally ring-shaped-body 4. A static sealing surface 6 is provided for establishing compressed sealed relation with a peripheral groove wall of a seal groove, and a dynamic sealing surface 8 is provided for establishing compressed sealed relation with a relatively rotatable surface. Seal 2 defines a first seal body end 10 for being oriented toward a lubricant supply, and defines a second seal body end 12 for being oriented toward an environment. The dynamic sealing surface 8 defines a exclusion edge 14, which is preferably circular and abrupt. Seal 2 also defines at least one pressure manipulation feature 18 that is skewed relative to the direction of relative rotation, and that when compressed against the relatively rotatable surface, produces at least one skewed elevated contact pressure zone within the dynamic sealing interface between the seal 2 and the relatively rotatable surface to distribute lubricant across the dynamic sealing interface toward exclusion edge 14. In FIG. 2 the pressure manipulation feature 18 takes the form of at least one rounded projection located away from the lubricant-side edge 16 of dynamic sealing surface 8, and being skewed in relation to the relative rotation direction.

The lubricant-side edge of dynamic sealing surface 8 can be either wavy or straight, for the reasons discussed in conjunction with the seal of FIG. 1 and 1A. The seal can be oriented for radial or face sealing, just as discussed in conjunction with FIG. 1 and 1A. The seal may, if desired, incorporate a dynamic sealing lip 22 projecting from said generally ring-shaped-body 4 and defining said dynamic sealing surface 8 and said at least one pressure manipulation feature 18.

Discussion of FIG. 4

It is preferred that the generally ring-shaped-body of the present invention be solid; i.e. ungrooved, as shown by the generally ring-shaped-body 4 in FIGS. 1–3, so that the seal can perform more efficiently as a high pressure seal, and so that the seal develops sufficient interfacial contact pressure to efficiently exclude abrasives which may be present in the environment.

As shown in FIG. 4, however, it is possible to manufacture alternate-embodiment seals patterned generally after the features the seals of FIGS. 1–3 which incorporate an annular groove 24 per the teachings of commonly assigned U.S. Pat. No. 5,678,829 for applications where exclusion of environmental abrasives is not an important concern, but where it is desirable to have a low interfacial contact pressure to achieve the low torque and low self-generated heat taught by U.S. Pat. No. 5,678,829. Annular groove 24, which may be generally circular, defines respective first and second generally circular flexible body rims 26 and 28 which are flexible toward annular groove 24 to control interfacial contact pressure of dynamic sealing surface 8 against a relatively rotatable surface and thus regulate hydrodynamic film thickness, said second generally circular body rim 28 defining said dynamic sealing surface 8. In this seal, either side can be the lubricant side, and either side can be the environment side, and one or both sides of the dynamic sealing surface may be made with molded in waves, or may be made substantially circular. It is preferred, however, that the environment be on the side of the optional exclusion edge 14 shown in FIG. 14.

FIG. 4 is a longitudinal cross-sectional illustration of a seal 2 of the present invention taken at a cutting plane which is aligned with the theoretical center-line of the generally ring-shaped-body 4. A static sealing surface 6 is provided for establishing sealed relation with the peripheral groove wall of a seal groove, and a dynamic sealing surface 8 is provided for establishing compressed sealed relation with a relatively rotatable surface. Seal 2 defines a first seal body end 10. The dynamic sealing surface 8 defines a exclusion edge 14 which need not be abrupt or circular unless abruptness and circularity is desired for more efficient environment exclusion. Seal 2 defines at least one pressure manipulation feature 18 that is skewed relative to the direction of relative rotation, and that when compressed against the relatively rotatable surface, produces at least one skewed elevated contact pressure zone within the dynamic sealing interface between the seal 2 and the relatively rotatable surface to distribute lubricant across the dynamic sealing interface. In FIG. 4 the pressure manipulation feature 18 takes the form of at least one rounded projection. The pressure manipulation features 18 may effectively be located entirely within the region of the dynamic sealing surface 8 if desired, as discussed previously, such that the elevated contact pressure zones may effectively be located entirely within the dynamic sealing interface. The plurality of pressure manipulation features 18 collectively form at least one elevated contact pressure zone of skewed configuration for controlling movement of lubricant within the dynamic sealing interface.

The seal of FIG. 4 can be oriented for radial or face sealing, just as discussed in conjunction with the seal of FIG. 1 and 1A.

Discussion of FIG. 5

FIG. 5 is a longitudinal cross-sectional illustration of a seal 2 of the present invention taken at a cutting plane which is aligned with the theoretical center-line of the generally ring-shaped-body 4. A static sealing surface 6 is provided for establishing compressed sealed relation with a peripheral groove wall, and a dynamic sealing surface 8 is provided for establishing compressed sealed relation with a relatively rotatable surface. Seal 2 defines a first seal body end 10 for being oriented toward a lubricant supply and a second seal body end 12 for being oriented toward an environment. The dynamic sealing surface 8 defines a exclusion edge 14, which is preferably circular and abrupt.

The seal 2 may also incorporate a flexible transitional heel 33 for achieving increased contact pressure at the exclusion edge 14 per the teachings of commonly assigned U.S. Pat. No. 5,738,358. The flexible transitional heel 33 extends from the exclusion edge 14 to a circular corner 35 which is defined at the intersection of the flexible transitional heel 33 with second seal body end 12. The flexible transitional heel 33 has circular intersection with second seal body end 12 remote from dynamic sealing surface 8, and has circular intersection with dynamic sealing surface 8 remote from second seal body end 12. Because of the circular configuration of exclusion edge 14, the seal does not generate a hydrodynamic wedging action with the environment in response to relative rotary motion, and thereby functions to exclude particulate contaminants from the dynamic sealing interface. The exclusionary function of exclusion edge 14 is amplified by the flexible transitional heel 33 because the overhanging seal body material experiences compression which is reacted to relatively rotatable surface 6, thereby increasing interfacial contact pressure at exclusion edge 14 per the teachings of U.S. Pat. No. 5,738,358. The interfacial contact pressure adjacent to exclusion edge 14 can be regulated by controlling the size of the flexible transitional heel 33. The shape of flexible transitional heel 33 can vary from the specific geometry shown without departing from the spirit or scope of the present invention.

Seal 2 defines at least one pressure manipulation feature 18 that when compressed against the relatively rotatable surface, produces at least one elevated contact pressure zone within the dynamic sealing interface between the seal 2 and the relatively rotatable surface to distribute lubricant across the dynamic sealing interface. In FIG. 5 the pressure manipulation feature 18 takes the form of at least one projection located away from the lubricant-side edge 16 of dynamic sealing surface 8.

The lubricant-side edge of the dynamic sealing surface 8 can be wavy, put is preferred not to be wavy, for the reasons discussed in conjunction with the seal of FIG. 1 and 1A. The seal of FIG. 5 can be oriented for radial or face sealing, just as discussed in conjunction with the seal of FIG. 1 and 1A.

The seal of FIG. 5 incorporates means, per the teaching of commonly assigned U.S. Pat. No. 5,738,358, comprising the lower stiffness of a first circular ring-like seal section 30 compared to the higher stiffness of a second circular ring-like seal section 32, which enhances extrusion resistance, and which controls the hydrodynamic wedging of the film of lubricant by controlling interfacial contact force between dynamic sealing surface 8 and the relatively rotatable surface. With the multiple stiffness construction in conjunction with said at least one pressure manipulation feature 18, the resulting improved lubricant distribution provides lower torque, cooler operation, improved extrusion resistance, and improved flushing action.

As shown by FIG. 5, the seal may incorporate a dynamic sealing lip 22 and a static sealing lip 82, which may be in generally opposed relation to each other.

Discussion of FIGS. 6–6G

FIG. 6 is a fragmentary view of a seal 2 having a generally ring-shaped-body 4 which defines a theoretical center-line, and FIG. 6A is a longitudinal cross-sectional illustration thereof taken at cutting plane 6A—6A of FIG.6 which is aligned with said theoretical center-line. Seal 2 is designed to be located by a circular seal groove provided by a machine structure, said seal groove being defined by a first groove wall, a peripheral groove wall, and a second groove wall, and is designed to partition a lubricant supply from an environment. Seal 2 is further designed to be compressed between the peripheral groove wall and a relatively rotatable surface, which is in spaced relation to the structure. A static sealing surface 6 is provided for establishing compressed sealed relation with the peripheral groove wall, and a dynamic sealing surface 8 is provided for establishing compressed sealed relation with the relatively rotatable surface by establishing sealing contact pressure with said relatively rotatable surface. FIG. 6B is a development of a fragmentary portion of the dynamic sealing interface established between seal 2 and a relatively rotatable surface.

Seal 2 defines a first seal body end 10 for facing the first groove wall and for being oriented toward a lubricant supply, and defines a second seal body end 12 for facing the second seal groove wall, and for being oriented toward an environment. It is preferred that the first seal body end 10 and the second seal body end 12 be confined by between the first and second groove walls of the seal groove to prevent skew induced wear. The seal geometry shown in FIG. 6A is designed to provide room for thermal expansion of the seal relative to the seal groove, so as to prevent over-confinement.

The dynamic sealing surface 8 defines a exclusion edge 14, per the teachings of commonly assigned U.S. Pat. No. 4,610,319, for excluding the environment. In accordance with U.S. Pat. No. 4,610,319, exclusion edge 14 is preferably circular and abrupt, as shown, for improved exclusion performance. The lubricant side of dynamic sealing surface 8 does not need to have molded in waves.

The intersection of angulated unconstrained surface 54 and dynamic sealing surface 8 is blended by a Curve 52. In keeping with American drafting third angle projection conventional representation, theoretical intersections blended by curves in this document are projected as lines, therefore, for example, the angulated unconstrained surface 54 and dynamic sealing surface 8 appears as a line in FIG. 6 (For a discussion of this general blended intersection illustration practice see paragraph 7.36 and figure 7.44(b) on page 213 of the drafting textbook "Technical Drawing", 10th edition (Prentice-Hall, Upper Saddle River, N.J.: 1997).

It is preferred that the distance from exclusion edge 14 to the theoretical intersection between the dynamic sealing surface 8 and the flank angle of angulated unconstrained surface 54 be at least 1/16 inch, and preferably be in the range of at least 0.09 inch to at least 0.12 inch. (The flank angle of angulated unconstrained surface 54 is tangent to curve 52) By increasing the width of the dynamic sealing surface 8 over that of the prior art, a number of benefits occur. First of all, contrary to expectation and prior engineering judgement, when the width of the dynamic sealing surface 8 is increased, the average interfacial contact pressure between the dynamic sealing lip 22 and the relatively rotatable surface actually decreases. The contact pressure at the interface between the seal 2 and the relatively rotatable surface is one of the most important factors relating to hydrodynamic performance of the seal because it influences film thickness. The contact pressure goes down as the width of dynamic sealing surface 8 increases, and it is possible to hydrodynamically lubricate a dynamic sealing surface 8 which is wider than ever had been used in the prior art.

Curve 52 preferably has a rate of curvature that is less than the rate of curvature of a ⅛ inch radius (For example the rate of curvature of a ¼ inch radius is less than the rate of curvature of a ⅛ inch radius.) Curve 52 may take any suitable form, such as a radius, a compound curve, a portion of an ellipse, a portion of a sine wave curve, a portion of a parabolic curve, a portion of a cycloid curve, a portion of which/versiera curves, or combinations thereof Seal 2 defines a plurality of pressure manipulation features 18 that, when compressed against the relatively rotatable surface produce elevated contact pressure zones 34 within the dynamic sealing interface 36 between the seal 2 and the relatively rotatable surface, as shown in FIG. 6B, to distribute lubricant film across the dynamic sealing interface 36 toward exclusion edge 14. The interfacial contact pressure within elevated contact pressure zones 34 is higher than said sealing contact pressure remainder of dynamic sealing interface 36 owing to the geometry of pressure manipulation features 18.

At least one, and preferably a plurality of pressure manipulating features 18 are defined, each being located at least partially on said dynamic sealing surface 8 and collectively establishing at least one elevated contact pressure zone 34 with said relatively rotatable surface at least partially within said dynamic sealing interface, said at least one elevated contact pressure zone 34 interacting with said lubricant within said dynamic sealing interface for causing controlled movement of said lubricant toward said second seal body end. It is preferred that said at least one elevated contact pressure zone 34 be skewed.

The pressure manipulation features 18 shown and described throughout this specification may be elongated as shown, and may be skewed, as shown, with respect to generally ring-shaped-body 4, first seal body end 10, second seal body end 12, exclusion edge 14, lubricant-side edge 16, dynamic sealing lip 22, curve 52, angulated unconstrained surface 54, and the direction of relative rotation; the elevated contact pressure zones 34 shown and described throughout this specification may likewise be skewed, as shown, with respect to the same numbered items. As shown in FIG. 6, said plurality of pressure manipulating features may have a substantially common direction of skew.

The elevated contact pressure zones 34 cause diversion of the lubricant film toward exclusion edge 14 producing a strong diverting action which pumps lubricant across the dynamic sealing interface 36 from the lubricant side 38 toward the environment side 40. Some of the lubricant leaks past the elevated contact pressure. zones 34, thereby assuring adequate lubrication thereof. The elevated contact pressure zones 34 cause a net leakage of the film of lubricant from the dynamic sealing interface 36 into the environment.

It is an object of the present invention that at least a portion of each of the pressure manipulation features 18 be located within the region of the dynamic sealing surface 8 so that at least a portion of the elevated contact pressure zones 34 are located within the dynamic sealing interface 36. As discussed and shown in conjunction with FIG. 1, however, the pressure manipulation features 18 may effectively be located entirely within the region of the dynamic sealing surface 8 such that the elevated contact pressure zones 34 may effectively be located entirely within the dynamic sealing interface 36 because it has been determined that the pressure manipulation features are capable of initiating hydrodynamic lubrication by themselves, thereby eliminating the need for conventional hydrodynamic waves, and thereby allowing a substantially constant dynamic sealing surface width.

When the pressure manipulation features 18 are not located entirely within dynamic sealing surface 8, the lubricant-side 16 of the interfacial contact footprint becomes non-circular, or wavy, per the teachings of U.S. Pat. No. 4,610,319, by virtue of the projecting portions of the elevated contact pressure zones 34, as shown by FIG. 6B. Even when the pressure manipulation features 18 are located entirely within dynamic sealing surface 8, the lubricant-side of the interfacial contact footprint still becomes slightly non-circular, or wavy by virtue of the small compression variations caused by the pressure manipulation features 18 (as shown in FIG. 18), thereby providing hydrodynamic wedging in accordance with the teachings of U.S. Pat. No. 4,610,319.

The seal of FIG. 6–6G can be oriented for radial or face sealing, just as discussed in conjunction with the seal of FIG. 1 and 1A. The seal of FIG. 6 may, if desired, incorporate a dynamic sealing lip 22 projecting from said generally ring-shaped-body 4 and defining said dynamic sealing surface 8 and said at least one pressure manipulation feature 18. The seal of FIG. 6. can also, if desired, incorporate a static sealing lip 42 which may be in generally opposed relation to dynamic sealing lip 22 per the teachings of commonly assigned U.S. Pat. No. 5,230,520 for providing twist resistance via an approximation of compressive symmetry.

The angulated unconstrained surface 54 of the seal of FIG. 6–6A can be either wavy or un-wavy, for the reasons discussed in conjunction with the seal of FIG. 1 and 1A, but it is preferred to be circular and unwavy as shown in FIG. 6, because it has been determined that the pressure manipulation features 18 are capable of initiating hydrodynamic lubrication by themselves for introducing lubricant into the dynamic sealing interface 36 between the seal 2 and the relatively rotatable surface, thereby eliminating the need for conventional hydrodynamic waves, and thereby allowing a substantially constant dynamic sealing surface width and dynamic sealing lip width.

One of the benefits of having the lubricant-side edge 16 of the seal being straight is that the dynamic sealing lip 22, if employed, has relatively uniform stiffness under pressure, so it tends to deflect uniformly under conditions where the environment pressure is higher than the lubricant pressure, thereby preventing the skew-induced wear related to uneven deflection (of variable thickness lips) described above. Another benefit is that the seal is more stable in compression, compared to the prior art. Another benefit is that the hydrodynamic action is immune to circumferential relief of thermal expansion because the dynamic lip is of substantially uniform section throughout its circumference.

It can be appreciated that the pressure manipulation features 18 which are flattened in the dynamic sealing interface to produce elevated contact pressure zones 34 act to force the lubricant across the dynamic sealing interface and toward the exclusion edge 14 without need of conventional molded in waves. The pressure manipulation features 18 and elevated contact pressure zones 34 drive the lubricant toward the exclusion edge 14, but since they are substantially flattened against the relatively rotatable surface, they do not define the narrowest point of dynamic sealing lip, which is the weak point in conventional hydrodynamic seals, in terms of being breached first by axially acting abrasive wear and extrusion to produce a direct leak path.

The elevated contact pressure. zones 34 can be produced by many suitable forms of pressure manipulation features.

The fragmentary section views of FIGS. 6C through 6G are representative of such forms, and relate to cutting plane X—X in FIGS. 6–8. For example the pressure manipulation feature 18 of FIG. 6C has a pointed construction, while in FIG. 6F it has a rounded construction.

By controlling the shape and location of the cross-section of the pressure manipulation feature 18, one can control the location and magnitude of the contact pressure. For example, FIGS. 6D, 6E and 6G show a abrupt edge 44 and a gradual edge 46. By controlling the location and magnitude of the contact pressure, one can control the amount of hydrodynamic action, film thickness, and leakage and flushing action of the seal. The configuration of FIGS. 6D, 6E and 6G is particularly well suited to producing a strong hydrodynamic action because the lower contact pressure of the gradual edge 46 is efficient at hydrodynamically wedging lubricant, and the skewed high pressure contact zone produced by abrupt edge 44 is efficient at directing the oil toward exclusion edge 14. As shown in FIG. 6, the width of pressure manipulation features 18 can taper off at feature ends 48 and 50 if desired.

Discussion of FIGS. 7–7B

FIGS. 7–7B show an alternate arrangement of the concept disclosed above in conjunction with FIGS. 6–6G which is more suitable for relative rotation in either direction. FIG. 7 is a fragmentary view of a seal 2 having a generally ring-shaped-body 4 which defines a theoretical center-line, and FIG. 7A is a longitudinal cross-sectional illustration thereof taken at cutting plane 7A—7A of FIG. 7 which is aligned with said theoretical center-line. FIG. 7B is a development of a fragmentary portion of the dynamic sealing interface established between seal 2 and a relatively rotatable surface.

A static sealing surface 6 is provided for establishing compressed sealed relation with a peripheral groove wall, and a dynamic sealing surface 8 is provided for establishing compressed sealed relation with a relatively rotatable surface by establishing sealing contact pressure therewith. Seal 2 defines a first seal body end 10 for being oriented toward a lubricant supply, and defines a second seal body end 12 for being oriented toward an environment. Opposed pressure manipulation features 18 project from the seal 2; they are in opposing directions, being disposed in alternating skewed relation, to provide for efficient lubrication regardless of the direction of relative rotation of the relatively rotatable surface. The feature ends are disposed in spaced relation.

FIG. 7B shows a development of the contact between the dynamic sealing lip and the relatively rotatable surface, and show elevated contact pressure zones 34 in opposing relation within the dynamic sealing interface 36 between the seal 2 and the relatively rotatable surface. The elevated contact pressure zones 34, which establish zones of pressure higher than said sealing contact pressure, direct the lubricant toward edge exclusion edge 14 per the teachings of U.S. Ser. No. 09/073,410, thereby lubricating the dynamic sealing interface. One of the benefits of this arrangement over the prior art is that the dynamic lip has relatively uniform stiffness under pressure, so it tends to remain circular when the environment pressure is higher than the lubricant pressure. If the pressure manipulation features 18 wrap well around curve 52 onto angulated unconstrained surface 54, as shown, they will be exposed to lubricant even when thermal expansion of the seal 2 occurs.

The elevated contact pressure zones 34 can be produced by many suitable forms of pressure manipulation features. The fragmentary section views of FIGS. 6C through 6G are representative of such forms, and relate to cutting plane X—X in FIG. 7.

At least a portion of each of the pressure manipulation features 18 is located within the region of the dynamic sealing surface 8 so that at least a portion of the elevated contact pressure zones are located within the dynamic sealing interface. As discussed previously, the pressure manipulation features 18 may alternately be located entirely within the region of the dynamic sealing surface 8 such that the elevated contact pressure zones may effectively be located entirely within the dynamic sealing interface.

Discussion of FIGS. 8 and 9

FIGS. 8 and 9 are development of a fragmentary portion of the dynamic sealing surface of alternate embodiment seals. FIG. 8 shows that a plurality of pressure manipulation features 18 can touch one another to form a continuous shape, the feature ends of adjacent pressure manipulation features 18 being disposed in contact. The fragmentary section views of FIGS. 6C through 6G relate to cutting plane X—X in FIG. 7.

FIG. 9 shows a pressure manipulation feature 18 of continuous shape. The pressure manipulation features 18 of FIGS. 8 and 9 collectively form at least one skewed elevated contact pressure zone within the dynamic sealing interface to distribute lubricant across the dynamic sealing interface toward exclusion edge 14. Some of the lubricant leaks past said the skewed elevated contact pressure zone, thereby assuring adequate lubrication.

At least a portion of each of the pressure manipulation features 18 is located within the region of the dynamic sealing surface 8 so that at least a portion of the elevated contact pressure zones are located within the dynamic sealing interface. As discussed previously, the pressure manipulation features 18 may alternately be located entirely within the region of the dynamic sealing surface 8 such that the elevated contact pressure zones may effectively be located entirely within the dynamic sealing interface.

Discussion of FIGS. 10–11A

FIGS. 10 and 11 are fragmentary views of an uncompressed seals which are hydrodynamic seals having a generally ring-shaped-body. FIG. 10A is a longitudinal cross-sectional illustration taken at cutting plane 10A—10A of FIG.10, and FIG. 11A is a longitudinal cross-sectional illustration taken at cutting plane 11A—11A of FIG. 11.

FIGS. 10 and 10A and 11 and 11A show configurations of a seal 2 for unidirectional rotation having pressure manipulation features 18 which employ an abrupt edge 44 and an gradual edge 46 similar to that discussed in conjunction with FIGS. 6D, 6E and 6G. The gradual edge 46 serves to create a gently increasing contact pressure for efficient hydrodynamic action. The abrupt edge 44 diverts lubricant toward exclusion edge 14, preventing a substantial portion of the lubricant from escaping at abrupt edge 44. The arrows show the diversion of lubricant toward exclusion edge 14.

At least a portion of each of the pressure manipulation features 18 is located within the region of the dynamic sealing surface 8 so that at least a portion of the elevated contact pressure zones are located within the dynamic sealing interface. As discussed previously, the pressure manipulation features 18 may alternately be located entirely within the region of the dynamic sealing surface 8 such that the elevated contact pressure zones may effectively be located entirely within the dynamic sealing interface.

A static sealing surface 6 is provided for establishing compressed sealed relation with a peripheral groove wall, and a dynamic sealing surface 8 is provided for establishing compressed sealed relation with a relatively rotatable surface. Seal 2 defines a first seal body end 10 for being oriented toward a lubricant supply, and defines a second seal body end 12 for being oriented toward an environment. It can be appreciated that not all of the pressure manipulation features 18 need be formed with an abrupt edge 44 and a gradual edge 46.

Discussion of FIGS. 12–13A

FIGS. 12 and 13 are fragmentary views of an uncompressed seals which are hydrodynamic seals having a generally ring-shaped-body. FIG. 12A is a longitudinal cross-sectional illustration taken at cutting plane 12A—12A of FIG.12, and FIG. 13A is a longitudinal cross-sectional illustration taken at cutting plane 13A—13A of FIG. 13.

FIGS. 12 and 12A and 13 and 13A show configurations of a seal 2 for bi-directional rotation having pressure manipulation features 18 which employ an abrupt edge 44 and a gradual edge 46 similar to that discussed in conjunction with FIGS. 6D, 6E and 6G. The gradual edge 46 serves to create a gently increasing contact pressure for efficient hydrodynamic action. The abrupt edge 44 diverts lubricant toward exclusion edge 14, preventing a substantial portion of the lubricant from escaping at abrupt edge 44.

At least a portion of each of the pressure manipulation features 18 is located within the region of the dynamic sealing surface 8 so that at least a portion of the elevated contact pressure zones are located within the dynamic sealing interface. As discussed previously, the pressure manipulation features 18 may alternately be located entirely within the region of the dynamic sealing surface 8 such that the elevated contact pressure zones may effectively be located entirely within the dynamic sealing interface.

A static sealing surface 6 is provided for establishing compressed sealed relation with a peripheral groove wall, and a dynamic sealing surface 8 is provided for establishing compressed sealed relation with a relatively rotatable surface. Seal 2 defines a first seal body end 10 for being oriented toward a lubricant supply, and defines a second seal body end 12 for being oriented toward an environment.

Discussion of FIGS. 14–14C

FIGS. 14–14C show an alternate embodiment of the concepts disclosed above. FIG. 14 is a fragmentary view of a seal 2 having a generally ring-shaped-body which defines a theoretical center-line, and FIG. 14A is a longitudinal cross-sectional illustration thereof taken at cutting plane 14A—14A of FIG. 14 which is aligned with said theoretical center-line. The fragmentary section view 14C is representative of to cutting plane 14C—14C in FIG. 14, and shows that the pressure manipulation features 18 of FIG. 14 are the edges next to depressions 17 which are recessed, at least a part of said pressure manipulation features 18 and said depressions 17 being at least in part located on the dynamic sealing surface 8, which is provided for establishing compressed sealed relation with a relatively rotatable surface. This recessed construction is substantially flattened out in the dynamic sealing interface by seal compression. The plurality of depressions define a plurality of edges, and said edges define a plurality of pressure manipulating features which may be of elongate form as shown.

FIG. 14B shows a development of the contact between the dynamic sealing lip and the relatively rotatable surface.

Said depressions 17 produce reduced contact pressure zones 37 within the dynamic sealing interface 36 between the seal 2 and the relatively rotatable surface, and said edges 56 and 58 of depressions 17 produce elevated contact pressure zones within the dynamic sealing interface 36 between the seal 2 and the relatively rotatable surface. Said elevated contact pressure zones and said reduced contact pressure zones 37 direct lubricant toward edge exclusion edge 14.

A static sealing surface 6 is provided for establishing compressed sealed relation with a peripheral groove wall. Seal 2 defines a first seal body end 10 for being oriented toward a lubricant supply, and defines a second seal body end 12 for being oriented toward an environment. Note that the lubricant side 16 of dynamic sealing interface 36 is not perfectly straight due to local compressive disturbances caused of depressions 17 and pressure manipulation features 18.

Discussion of FIGS. 15–16

In the previous figures, seals where shown which have a projecting sealing lip having a dynamic sealing surface delineated on one side by an exclusion edge, and delineated on the other side by an angulated surface. FIGS. 15 and 16 show that the pressure manipulation features of the present invention do not require the specific dynamic sealing lip shape shown in FIGS. 1–14.

FIGS. 15 and 16 are fragmentary views of seals of the present invention, and FIGS. 15A and 16A are longitudinal cross-sectional illustration taken respectively at cutting plane 15A—15A and 16A—16A.

In the seals of FIGS. 15 & 16, a static sealing surface 6 is provided for establishing compressed sealed relation with a peripheral groove wall, and a dynamic sealing surface 8 is provided for establishing compressed sealed relation with a relatively rotatable surface. Seal 2 defines a first seal body end 10 for being oriented toward a lubricant supply, and defines a second seal body end 12 for being oriented toward an environment.

In FIG. 15, a seal 2 is shown having a generally ring-shaped-body 4 of solid (ungrooved) construction. The pressure manipulation features 18 are superimposed on a dynamic sealing surface 8 of substantially conical configuration which is defined by a dynamic sealing lip 22.

In FIG. 16, a seal 2 is shown having a generally ring-shaped-body 4 of solid (ungrooved) construction. The pressure manipulation features 18 are superimposed on a dynamic sealing surface 8 of curved configuration which is defined by a dynamic sealing lip 22. The curved configuration of dynamic sealing surface 8 may take any suitable form, such as a radius, a compound curve, a portion of an ellipse, a portion of a sine wave curve, a portion of a parabolic curve, a portion of a cycloid curve, a portion of witch/versiera curves, or combinations thereof.

The pressure manipulation features 18 of FIGS. 15 and 16 form elevated contact pressure zones within the dynamic sealing interface to distribute lubricant across the dynamic sealing interface toward exclusion edge 14.

Discussion of FIG. 17

Compared to the prior art, the present invention is more suited to being constrained between first and second gland walls for the purpose of resisting skew-induced wear, because in the prior art the effective compressed height of the large molded-in waves decreases at elevated temperature because the surplus seal volume resulting from differential thermal expansion tends to be relieved circumferentially into the low points of the waves, which can reduce hydrodynamic pumping action. Such is not encountered in the present invention because large molded in waves are not required.

Also, in the prior art, the volume provided within the seal groove to accommodate thermal expansion of the seal had to take into consideration the seal geometry at the high point of the large molded in waves, thus requiring more volume within the groove. With the present invention, less thermal expansion room has to be provided, because there is no high point of the wave to be considered when determining the appropriate expansion room.

FIG. 17 is fragmentary cross-sectional illustration of a seal 2 representing the present invention, showing the installed condition of the seal 2 within the generally circular seal groove 60 of a structure 62 such as a housing and compressed in sealing relation against peripheral groove wall 64 and against relatively rotatable surface 66, and secured in skew resisting confinement between first groove wall 68 and second groove wall 70 of the generally circular seal groove 60. For orientation purposes, it should be understood that in the longitudinal cross-section of FIG. 17, the cutting plane of the cross-section passes through and is aligned with the longitudinal axis of the seal 2 and the generally circular seal groove 60.

Seal 2 has a seal body 4 which is generally circular and may be solid as shown, and which has a first seal body end 10 and a second seal body end 12.

In the hydrodynamic seal industry, first groove wall 68 is often referred to as the "lubricant side gland wall", and second groove wall 70 is often referred to as the "environment side gland wall". Likewise, the first seal body end 10 is often referred to as the lubricant end, and the second seal body end 12 is often referred to as the environment end. First groove wall 68 and second groove wall 70 are in spaced, generally opposed relation to each other, and the first seal body end 10 and the second seal body end 12 are in generally opposed relation to each other. Peripheral groove wall 64 and relatively rotatable surface 66 are also in generally opposed relation, and peripheral groove wall 64 is sized to hold the seal 2 in compression against relatively rotatable surface 66.

For the purpose of establishing consistent nomenclature in this document, the seal "groove" 60 is the void in structure 62 that is defined by peripheral groove wall 64, first groove wall 68 and second groove wall 70. Also for the purpose of establishing consistent nomenclature, the seal "gland" is the enclosed space defined by peripheral groove wall 64, first groove wall 68, second groove wall 70 of the generally circular seal groove 60, and relatively rotatable surface 66.

This invention has application where a relatively rotatable surface 66 is sealed with respect to a structure 62 with either the structure 62 or the relatively rotatable surface, or both, being rotatable. Although first groove wall 68 and second groove wall 70 are shown to be in fixed, permanent relation with one another, such is not intended to limit the scope of the invention, for the invention admits to other equally suitable forms. For example, first groove wall 68 and/or second groove wall 70 could be detachable from the structure for ease of maintenance and repair, but installed in fixed relation to each other during equipment operation to constrain seal 2.

Seal 2 may be composed of any one of a number of suitable materials including elastomeric or rubber-like sealing material and various polymeric sealing materials, or any suitable combination thereof, including a composite construction where one portion of the seal is of a different material than the other, however, seal 2 is constructed at least in part from a resilient sealing material such as an elastomer. The preferred material is an elastomer having a nominal Shore A hardness in the range of 73–92. Seal 2, which has a generally ring shaped solid body, is adapted to be received in a generally circular seal groove 60 of a structure or housing 62, and used to partition a lubricant 72 from an environment 74 which may contain abrasive particulate matter, and is used to prevent intermixing of the environment into the lubricant, and is used for controlling seal deformation and for controlling interfacial contact force between the seal 2 and the relatively rotatable surface 66.

Seal 2 can incorporate dynamic sealing lip 22 that is of generally circular configuration which defines dynamic sealing surface 8 being of generally annular configuration, lubricant 72 being in contact with a portion of said dynamic sealing lip. Seal 2 preferably also defines a static sealing surface 6. Dynamic sealing lip 22 and static sealing surface 6 may be oriented in generally opposed relation to each other.

The seal 2 may be configured for radial or axial (face) sealing. In a radial sealing configuration, static sealing surface 6, dynamic sealing surface 8, peripheral groove wall 64 and relatively rotatable surface 66 may be of substantially cylindrical configuration, and first groove wall 68, second groove wall 70, first seal body end 10, and second seal body end 12 may be of substantially planar configuration, and said dynamic sealing lip 22 may project from said generally circular seal body 4 in a substantially radial direction.

In an axial (face) sealing configuration, static sealing surface 6, dynamic sealing surface 8, peripheral groove wall 64 and relatively rotatable surface 66 may be of substantially planar configuration, and first groove wall 68, second groove wall 70, first seal body end 10, and the second seal body end 12 may be of substantially cylindrical configuration, and said dynamic sealing lip 22 may project from said generally circular seal body 4 in a substantially axial direction.

Local length "U" is the length of that portion of seal 2 which does not contact relatively rotatable surface 66. Compression of seal 2 between peripheral groove wall 64 and relatively rotatable surface 66 establishes a generally circular static sealing interface between peripheral groove wall 64 and the mating static sealing surface 6, and establishes a generally circular dynamic sealing interface between relatively rotatable surface 66 and the mating dynamic sealing surface 8, said dynamic sealing interface having a width "W" which is equal to width "LG" minus local length "U". When seal 2 is installed in compression between peripheral groove wall 64 and relatively rotatable surface 66, local width "W" consists of dynamic sealing surface 8 and a portion of adjacent surfaces of the dynamic sealing lip 22 due to compression induced flattening of dynamic sealing lip 22.

Structure 62 forms at least part of a lubricant chamber which serves to contain lubricant 72. When relative rotation occurs between structure 62 and relatively rotatable surface 66, the circumferential direction of relative rotation is normal to the plane of the cross-section of FIG. 17, and seal 2 remains stationary relative to structure 62 and maintains a static sealing interface with structure 62, and relatively rotatable surface 66 slips with respect to dynamic sealing surface 8, and the interface between seal 2 and the relatively rotatable surface 66 becomes a dynamic sealing interface. The exclusion edge 14 of dynamic sealing surface 8 is preferably circular and preferably abrupt.

There is at least one pressure manipulating feature 18 and preferably a plurality of pressure manipulating features 18 located in spaced relation, being defined at least partially on said dynamic sealing surface 8 and being oriented for collectively defining at least one elongate contact pressure zone that is preferably disposed in skewed relation with said first and second seal body ends.

Because of the pressure manipulation features 18 and the resulting elevated contact pressure zones 34 described in conjunction with previous figures, a film of lubricant is hydrodynamically wedged into the dynamic sealing interface between the dynamic sealing lip 22 and relatively rotatable surface 66, thereby causing dynamic sealing surface 8 to hydrodynamically lift and ride on the film, thereby lubricating dynamic sealing surface 8 and relatively rotatable surface 66. This lubricant film physically separates the seal 2 and the relatively rotatable surface 66, and thereby prevents the typical dry rubbing type wear associated with conventional non-hydrodynamic interference-type seals, and thereby prolongs seal and mating surface life and makes higher service pressures practical. The elevated contact pressure zones interact with lubricant within said dynamic sealing interface during said relative rotation for causing contact pressure induced lubricant movement within said dynamic sealing interface toward said second seal body end.

When relative rotation is not present, a liquid tight seal is maintained at the static sealing interface between the static sealing surface 6 and peripheral groove wall 64, and between the dynamic sealing surface 8 and the relatively rotatable surface 66.

When seal 2 is compressed between peripheral groove wall 64 and relatively rotatable surface 66, the width of the seal 2 increases due to displacement of compressed seal material. When seal 2 is subjected to elevated temperature operating conditions, the width of the seal 2 further tends to increase due to thermal expansion. Seal 2 is often used in an elevated temperature environment, and also generates its own heat due to lubricant shear and asperity contact in the dynamic sealing interface. The seal experiences volumetric thermal expansion, which is about triple the linear coefficient of thermal expansion.

In the prior art, it has been specifically taught that the seal body should not be in simultaneous contact with both the lubricant side gland wall and the environment side gland wall, because such confinement, in view of the unpredictable installed width of the seal, could cause high interfacial contact pressure incompatible with hydrodynamic lubrication at the dynamic sealing interface, resulting in seal damage. Contrary to conventional wisdom and the teachings of the prior art, the body of the seal 2 of the present invention can, if desired, be simultaneously in contact with both the first groove wall 68 and the second groove wall 70; that is to say that the first seal body end 10 may contact first groove wall 68, and the second seal body end 12 may contact second groove wall 70, contrary to prior engineering judgement.

For ease of installation, the room temperature, uninstalled width of Seal 2 can be less than the distance "LG" between first groove wall 68 and second groove wall 70. Seal 2 can be designed such that the aforementioned installation compression-induced width increase causes seal 2 to be simultaneously in contact with both the first groove wall 68 and the second groove wall 70 after installation In practice, the width of seal 2 cannot increase to a value greater than the distance "LG" between first groove wall 68 and second groove wall 70 because of the physical constraint provided by first groove wall 68 and second groove wall 70. Once the seal width has increased to the point that it equals the distance "LG" between first groove wall 68 and second groove wall 70, any additional compression or thermal expansion of seal 2 is compensated by displacement of angulated unconstrained surface 54 toward relatively rotatable surface 66. Local width "W" increases as a function of increased confinement of the seal, and as a function of increased temperature-induced thermal expansion.

As noted previously, local length "U" is the length of seal 2 which does not contact relatively rotatable surface 66. The seal body 4 of the present invention serves as an integral spring element over local length "U", and angulated unconstrained surface 54 bulges toward relatively rotatable surface 66 when seal 2 is squeezed between first groove wall 68 and second groove wall 70 as a result of seal compression, tolerance accumulation, and thermal expansion.

In the prior art, the seal volume and seal groove volume had to be designed such that the seal groove could accommodate thermal expansion at the high point of the wavy lip, which has more area than the remainder of the seal. Because the dynamic sealing lip of the present invention need not vary substantially in width, the seal groove does not have to provide as much room for seal thermal expansion, compared to prior art, and therefore it is not as difficult to balance seal volume to gland volume.

The dimensional relationships desired in the present invention can be expressed mathematically using the following variables:

As Area of the longitudinal seal cross-sectional shape at the average width of the sealing lip, with the cross-section being taken on a cutting plane which passes through the longitudinal axis of the seal.

C Three-dimensional coefficient of thermal expansion, of the seal material used to construct the seal.

D Room temperature uninstalled depth of the seal body cross-section, as measured from static sealing surface 6 to dynamic sealing surface 8.

DG The distance between relatively rotatable surface 66 and peripheral groove wall 64.

Dm Mean diameter of the seal cross-section; i.e. (inside diameter+outside diameter)/2.

G Room temperature (70 degrees Fahrenheit) gland volume, using the explicit definition of "gland" that was defined above in this document.

L Room temperature uninstalled width of the seal cross-section, as measured from first seal body end 10 to second seal body end 12.

LG The distance between first groove wall 68 and second groove wall 70.

Rg Room temperature volume of the groove, using the explicit definition of "groove" that was defined above in this document.

Rv A theoretical volume equal to the mean diameter Dm of the seal times 3.1416×L×D.

S Room temperature volume of the seal.

XG Radial extrusion gap dimension between structure 62 and relatively rotatable surface 66.

One very basic specification of the present invention is that the room temperature volume "S" of the seal 2 should be less than the room temperature volume Rg of the generally circular seal groove 60. It is also fundamental that the gland volume G be greater than S+S×C×280 degrees Fahrenheit.

To assure sufficient void area within the gland to accommodate thermal expansion and material displaced by compression, etc., the average sectional area As of the seal, when divided by (L×D), should yield a quotient of less than 0.84 if the seal is to be constrained by the gland.

To assure sufficient void volume within the gland to accommodate thermal expansion and material displaced by compression, etc., the volume S of the seal, when divided by Rv, should yield a quotient of less than 0.84, and the volume S of the seal, when divided by G, should yield a quotient of less than 0.85 if the seal is to be constrained by the gland.

To assure constraint, D times L should be equal to or preferably greater than DG times LG.

The force resulting from the seal body 4 being compressed between the first groove wall 68 and the second groove wall 70 forces the second seal body end 12 into firm contact with the second groove wall 70 and supports the seal against circumferential compression-induced buckling that could otherwise occur. The exclusion edge 14 of dynamic sealing surface 8 is thus held in the intended circular configuration and therefore can not generate a hydrodynamic wedging action with the environment 74 in response to relative rotary motion, and thereby functions as intended to exclude particulate contaminants from the dynamic sealing interface.

For optimum constraint, orientation, and seal compression, the groove corner radii 78 and 80 should preferably be less than 15% of the result of dimension "DG" minus dimension "XG".

The spring effect over local length "U" of the seal body 4 can be made relatively stiff compared to the resilient projecting spring elements shown in U.S. Pat. No. 5,873,576, which helps to minimize differential pressure-induced shuttling and twisting of the seal within the generally circular seal groove 60, and thereby helps to prevent abrasive ingestion.

The continuous circular nature of first seal body end 10 of the present invention makes the present invention more immune to skew-induced impingement wear compared to the prior art of U.S. Pat. No. 5,873,576. The lubricant side communication slots in certain embodiments of the seals of U.S. Pat. No. 5,873,576 contribute to seal distortion and resulting skew-induced impingement wear if the environment pressure is greater than the lubricant pressure. The continuous surface of the first seal body end 10 of the present invention provides continuous circular support, and thereby resists differential pressure induced skewing of the seal within the groove because there are no communication passages for sealing material to be forced into by environmental pressure.

Another stabilization feature of the present invention in downhole drilling applications is that during operation the first seal body end 10 establishes a sealing relationship with first groove wall 68, and second seal body end 12 establishes a sealing relationship with second groove wall 70. This means that the downhole ambient pressure can act across the sealed area between first groove wall 68 and second groove wall 70 to create a hydraulic force which hold the seal in firm contact against peripheral groove wall 64. This hydraulic force prevents seal 2 from rotating in a counter-clockwise direction, with the counter-clockwise direction visualized in reference to FIG. 17.

The seal body 4 acts as a spring over local length "U" and serves to hold the second seal body end 12 against the second groove wall 70 and establishes a contact pressure there-between which helps to prevent environmental particulates from collecting between the second seal body end 12 and the second groove wall 70. If particulate matter is allowed to build up between the second seal body end 12 and the second groove wall 70, it may build up unevenly, which can skew the seal locally and cause skew-induced abrasive ingestion.

The confinement of the seal body 4 by the groove is relied upon to support the dynamic sealing lip 22 against differential pressure induced deflection when the pressure of the environment 74 exceeds the pressure of the lubricant 72. Since the dynamic sealing lip need not vary in the present invention, it remains circular even when the environment pressure is higher than the lubricant pressure.

Since the second seal body end 12 of seal 2 has substantially the same shape as the second groove wall 70, and since the extrusion gap "XG" between structure 2 and relatively rotatable surface 66 can be maintained at a small dimension if desired, the seal of the present invention is also well suited for service conditions where the pressure of the lubricant 72 is significantly greater than that of the environment 74, because the seal is generally well supported by against the differential pressure by the second groove wall 70 at all locations (except extrusion gap "XG") in a manner that tends to resist distortion and extrusion of seal material, and the general shape of the seal is therefore not distorted by the differential pressure acting over it. Extrusion gap "XG" should be less than 15% of distance "DG, and it is preferably less than 1/32", for low pressure or zero pressure applications, and smaller for high pressure applications.

Discussion of FIGS. 18–18B

FIG. 18 is a fragmentary view of a seal 2 having a generally ring-shaped-body which defines a theoretical center-line, and FIG. 18A is a longitudinal cross-sectional illustration thereof taken at cutting plane 18A—18A of FIG.18 which is aligned with said theoretical center-line. A static sealing surface 6 is provided for establishing compressed sealed relation with a peripheral groove wall, and a dynamic sealing surface 8 is provided for establishing compressed sealed relation with a relatively rotatable surface. FIG. 18B is a development of a fragmentary portion of the dynamic sealing interface established between seal 2 and a relatively rotatable surface.

Seal 2 defines a first seal body end 10 for being oriented toward a lubricant supply, and defines a second seal body end 12 for being oriented toward an environment. The dynamic sealing surface 8 defines a exclusion edge 14, which is preferably abrupt as shown, for excluding the environment. The angulated unconstrained surface 54 of dynamic sealing lip 22 does not have molded in waves, and the width of dynamic sealing lip 22 is substantially constant about the circumference of seal 2. The intersection of angulated unconstrained surface 54 and dynamic sealing surface 8 may be blended by a curve 52 which preferably has a rate of curvature that is less than the rate of curvature of a 1/8 inch radius (For example the rate of curvature of a 1/4 inch radius is less than the rate of curvature of a 1/8 inch radius.) Curve 52 may take any suitable form, such as a radius, a compound curve, a portion of an ellipse, a portion of a sine wave curve, a portion of a parabolic curve, a portion of a cycloid curve, a portion of witch/versiera curves, or combinations thereof Seal 2 defines a plurality of pressure manipulation features 18 that, when compressed against the relatively rotatable surface produce elevated contact pressure zones 34, within the dynamic sealing interface 36, as shown in FIG. 18B. In the embodiment of FIG. 18, the pressure manipulation features 18 are located entirely within the region of the dynamic sealing surface 8 such that the elevated contact pressure zones 34 are effectively be located entirely within the dynamic sealing interface 36. When the pressure manipulation features 18 are located entirely within dynamic sealing surface 8, the lubricant-side 16 of the dynamic sealing interface 36 becomes slightly non-circular, or wavy by virtue of the small compression variations caused by the pressure manipulation features 18, thereby providing hydrodynamic wedging in accordance with the teachings of U.S. Pat. No. 4,610,319. The pressure manipulation features; can take any suitable form, such as the rounded end pressure manipulation features shown.

The interfacial contact pressure within elevated contact pressure zones 34 is higher than the remainder of dynamic sealing interface 36 owing to the geometry of pressure manipulation features 18. The elevated contact pressure zones 34 cause diversion of the lubricant film toward exclusion edge 14 from the lubricant side 38 toward the environment side 40 causing a net leakage of the film of lubricant from the dynamic sealing interface 36 into the environment.

Conclusions

The pressure manipulation features of the present invention provide improved distribution of lubricant across the dynamic sealing interface without the use of large molded waves. The hydrodynamic action is produced by pressure manipulation features which establish elevated contact pressure zones and produce a slightly wavy hydrodynamic edge at the footprint of the dynamic sealing interface without substantially altering the local stiffness of the dynamic sealing lip.

Because there are no large molded in waves required, the present invention avoids the low-point weaknesses associated with the prior art. When the lubricant pressure is higher than the environment pressure, the resulting bending, shear and other stresses on the sealing material are substantially uniform about the circumference of the seal because of the substantially uniform width of the dynamic sealing lip.

When extrusion damage, and wear damage caused by environmental abrasives, can progressively destroy the dynamic sealing surface, beginning at the abrupt exclusion edge and progressively working toward lubricant side, the damage has to work across the entire width of the sealing surface, because, compared to the prior art, there is no low point of the wave to be breached first by the damage.

Because the dynamic sealing lip has substantially uniform thickness, compared to the prior art seal, the seals of the present invention have better compressive stability and are less likely to become twisted and skewed within the seal groove, and are less likely to become buckled within the gland, and the exclusion edge is less likely to acquire a skewed position within the gland, therefore the seal has improved abrasion resistance.

With the prior art seals, when the environment pressure is higher than the lubricant pressure, the prior art dynamic sealing lip deforms unevenly due to its varying width, causing the environment-side edge to become non-circular and more prone to abrasion by the environment. In the present invention, the lip deflects uniformly because it can be made substantially uniform in thickness, therefore it is less likely to suffer abrasion damage, compared to the prior art, when exposed to an environment pressure that is higher than the lubricant pressure.

In the prior art, the seal volume and seal groove volume had to be designed such that the seal groove could accommodate thermal expansion at the high point of the wavy lip, which has more area than the remainder of the seal. Because the dynamic sealing lip of the present invention need not vary substantially in width, the seal groove does not have to provide as much room for seal thermal expansion, compared to prior art, and therefore it is not as difficult to balance seal volume to gland volume.

In the prior art, thermal expansion of axially confined seals caused circumferential material displacement from the thickest point of the lip to the thinnest point of the lip, thereby diminishing hydrodynamic lubrication. This problem does not exist with the constant dynamic sealing lip width which can be employed in the present invention.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A hydrodynamic seal, comprising:
   (a) a generally ring-shaped body of sealing material having first and second oppositely facing seal body ends and a static sealing surface;
   (b) a dynamic sealing lip being defined by said generally ring-shaped body of sealing material and defining a dynamic sealing surface having a width;
   (c) at least one pressure manipulating feature located at least partially on said dynamic sealing surface; and
   (d) said at least one pressure manipulating feature being circumferentially discontinuous, providing at least one lubricant migration path across said width of said dynamic sealing surface.

2. The hydrodynamic seal of claim 1, comprising:
   said at least one pressure manipulating feature being a plurality of pressure manipulating features projecting from said dynamic sealing surface.

3. The hydrodynamic seal of claim 1, comprising:
   said at least one pressure manipulating feature being a plurality of pressure manipulating features projecting from said dynamic sealing surface and being disposed in spaced relation with respect to one another.

4. The hydrodynamic seal of claim 1, comprising:
   said at least one pressure manipulating feature being a plurality of pressure manipulating features each being of elongate configuration and defining feature ends and being disposed in skewed relation with respect to said direction of relative rotation.

5. The hydrodynamic seal of claim 4, comprising:
   (a) said generally ring-shaped body being comprised of polymeric sealing material; and
   (b) each of said plurality of pressure manipulating features having a substantially common direction of skew.

6. The hydrodynamic seal of claim 4, comprising:
   said plurality of pressure manipulating features being disposed in alternating skewed relation.

7. The hydrodynamic seal of claim 6, comprising:
   said feature ends being disposed in spaced relation.

8. The hydrodynamic seal of claim 1, comprising:
   (a) said dynamic sealing surface being of generally annular configuration; and
   (b) said at least one pressure manipulating feature being a plurality of pressure manipulating features located in spaced relation on said dynamic sealing surface and being oriented for collectively defining at least one elongate contact pressure zone that is disposed in skewed relation with said first seal body end.

9. The hydrodynamic seal of claim 1, comprising:
   (a) said at least one pressure manipulating feature being a plurality of pressure manipulation features;
   (b) a plurality of depressions defining edges; and
   (c) said edges defining said plurality of pressure manipulating features.

10. A hydrodynamic seal, comprising:
    (a) a generally ring-shaped body of resilient sealing material having first and second oppositely facing seal body ends and a static sealing surface;
    (b) a dynamic sealing lip being defined by said generally ring-shaped body of sealing material and having a dynamic sealing surface;
    (c) at least one pressure manipulating feature located at least partially on said dynamic sealing surface; and
    (d) said generally ring-shaped body of sealing material having a first section having a first stiffness and having a second section having a second stiffness being greater than said first stiffness.

11. A hydrodynamic seal, comprising:
    (a) a generally ring-shaped body of sealing material having first and second oppositely facing seal body ends and a static sealing surface;
    (b) a dynamic sealing lip being defined by said generally ring-shaped body of sealing material and having a dynamic sealing surface;
    (c) at least one pressure manipulating feature located at least partially on said dynamic sealing surface;
    (d) a structure defining first and second spaced groove walls and a peripheral groove wall defining a generally circular seal groove;
    (e) said generally ring-shaped body being located within said generally circular seal groove with said first and second oppositely facing seal body ends disposed in contact with said first and second spaced groove walls; and
    (f) at least a portion of said dynamic sealing lip being disposed in contact with said second spaced groove wall.

12. A hydrodynamic seal, comprising:
    (a) a generally ring-shaped monolithic body comprised of polymeric sealing material having first and second oppositely facing seal body ends and a static sealing surface;
    (b) a dynamic sealing lip being defined by said generally ring-shaped monolithic body of sealing material and defining a dynamic sealing surface;
    (c) a plurality of pressure manipulating features disposed in alternating skewed relation being located at least partially on said dynamic sealing surface and defining feature ends, said feature ends of adjacent ones of said plurality of pressure manipulating features being disposed in contact.

13. A hydrodynamic seal, comprising:
    (a) a generally ring-shaped body of sealing material having first and second oppositely facing seal body ends and a static sealing surface;
    (b) a dynamic sealing lip being defined by said generally ring-shaped body of sealing material and having a dynamic sealing surface;
    (c) a plurality of pressure manipulating features being located at least partially on said dynamic sealing surface, at least one of said plurality of pressure manipulating features defining a leading edge and a trailing edge; and
    (d) said leading edge of said at least one of said plurality of pressure manipulating features being abruptly sloped and said trailing edge being gently sloped.

14. A hydrodynamic seal, comprising:
    (a) a generally ring-shaped body of sealing material having first and second oppositely facing seal body ends and a static sealing surface;
    (b) a dynamic sealing lip being defined by said generally ring-shaped body of sealing material and having a dynamic sealing surface;
    (c) a plurality of pressure manipulating features being located at least partially on said dynamic sealing surface, at least one of said plurality of pressure manipulating features defining a leading edge and a trailing edge; and (d) said leading edge of said at least one of said plurality of pressure manipulating features being gently sloped and said trailing edge being abruptly sloped.

15. A hydrodynamic seal, comprising:

(a) a generally ring-shaped body of sealing material having first and second oppositely facing seal body ends and a static sealing surface;

(b) a dynamic sealing lip being defined by said generally ring-shaped body of sealing material and defining a dynamic sealing surface;

(c) at least one pressure manipulating feature located at least partially on said dynamic sealing surface;

(d) an exclusion edge being defined by said dynamic sealing lip;

(e) an angulated unconstrained surface being defined by said generally ring-shaped body and establishing a theoretical intersection with said dynamic sealing surface; and (f) said exclusion edge and said theoretical intersection being spaced a minimum distance of 1/16 inch.

16. A hydrodynamic seal, comprising:

(a) a generally ring-shaped body of sealing material having first and second oppositely facing seal body ends and a static sealing surface;

(b) a dynamic sealing lip being defined by said generally ring-shaped body of sealing material and having a dynamic sealing surface;

(c) at least one pressure manipulating feature located at least partially on said dynamic sealing surface;

(d) said dynamic sealing lip defining an angulated surface being disposed in angular relation with said dynamic sealing surface; and (e) said at least one pressure manipulating feature being a plurality of pressure manipulating features each being of elongate configuration and having portions thereof located on said dynamic sealing surface and portions thereof located on said angulated surface.

17. The hydrodynamic seal of claim 16, comprising:

at least one of said plurality of pressure manipulating features being disposed in skewed relation with said first seal body end.

18. A hydrodynamic seal, comprising:

(a) a generally ring-shaped body of sealing material having a static sealing surface;

(b) a dynamic sealing lip being defined by said generally ring-shaped body of sealing material and defining a dynamic sealing surface having a width;

(c) a relatively rotatable surface being in sealing contact with said dynamic sealing surface and establishing a dynamic sealing interface therewith, said relatively rotatable surface and said dynamic sealing lip defining at least one direction of relative rotation;

(d) a lubricant having contact with said dynamic sealing lip and said relatively rotatable surface and being present within said dynamic sealing interface; and (e) a plurality of pressure manipulating features each being located at least partially on said dynamic sealing surface and being spaced to define lubricant migration paths across said width of said dynamic sealing surface, said pressure manipulating features collectively establishing at least one elevated contact pressure zone with said relatively rotatable surface at least partially within said dynamic sealing interface, said at least one elevated contact pressure zone interacting with said lubricant within said dynamic sealing interface for causing controlled movement of said lubricant across said dynamic sealing interface.

19. The hydrodynamic seal of claim 18, comprising:

said at least one elevated contact pressure zone being disposed in skewed relation with said at least one direction of relative rotation.

20. The hydrodynamic seal of claim 18, comprising:

said plurality of pressure manipulating features being projections projecting from said dynamic sealing surface.

21. The hydrodynamic seal of claim 18, comprising:

(a) a plurality of depressions defining edges; and (b) said edges defining said plurality of pressure manipulating features.

22. A sealing device, comprising:

(a) a generally ring shaped body;

(b) a protuberant static sealing lip being defined by said generally ring-shaped body and defining a static sealing surface;

(c) a dynamic sealing lip being in generally opposed relation to said static sealing lip and defining a dynamic sealing surface; and (d) a plurality of pressure manipulation features projecting from said dynamic sealing surface.

23. The sealing device of claim 22, comprising:

(a) a relatively rotatable surface establishing a direction of relative rotation and establishing a dynamic sealing interface with said dynamic sealing surface; and (b) said plurality of pressure manipulation features collectively establishing at least one elevated contact pressure zone within said dynamic sealing interface, said at least one elevated contact pressure zone being disposed in skewed relation with said direction of relative rotation.

24. A sealing device, comprising:

(a) a monolithic generally ring-shaped body;

(b) a static sealing surface being defined by said generally ring-shaped body;

(c) a dynamic sealing lip being in generally opposed relation to said static sealing surface and defining a dynamic sealing surface;

(d) a plurality of pressure manipulation features projecting from said dynamic sealing lip; and (e) said plurality of pressure manipulation features being skewed with respect to said dynamic sealing lip.

25. A sealing device, comprising:

(a) a structure;

(b) a relatively rotatable surface disposed in spaced relation to said structure and having a direction of relative rotation relative to said structure;

(c) a seal being located by said structure and comprising:
  (i) a generally ring-shaped body;
  (ii) a dynamic sealing surface having a width;
  (iii) a plurality of pressure manipulation features projecting from said dynamic sealing surface;

(d) said dynamic sealing surface establishing sealing contact pressure with said relatively rotatable surface;

(e) said plurality of pressure manipulation features being disposed in spaced relation and defining lubricant paths across said width of said dynamic sealing surface, said plurality of pressure manipulation features establishing at least one elevated contact pressure zone having contact pressure greater than said sealing contact pressure; and (f) said at least one elevated contact pressure zone being skewed with respect to said direction of relative rotation.

26. The sealing device of claim 25, wherein:

said dynamic sealing surface defining an exclusion edge of generally circular configuration.

27. The sealing device of claim 26, wherein:

said exclusion edge being of abrupt configuration.

28. A sealing device, comprising:
(a) a structure;
(b) a relatively rotatable surface disposed in spaced relation to said structure and having a direction of relative rotation relative to said structure;
(c) a seal being located by said structure and comprising:
    (i) a generally ring-shaped body;
    (ii) a dynamic sealing surface; and
    (iii) a plurality of pressure manipulation features projecting from said dynamic sealing surface;
(d) said dynamic sealing surface establishing sealing contact pressure with said relatively rotatable surface;
(e) said plurality of pressure manipulation features establishing at least one elevated contact pressure zone having contact pressure greater than said sealing contact pressure;
(f) said at least one elevated contact pressure zone being skewed with respect to said direction of relative rotation;
(g) said generally ring-shaped body defining first and second generally circular flexible body rims; and
(h) said second generally circular body rim defining said dynamic sealing surface.

29. A method for establishing a sealed partition between an environment and a lubricant, comprising;
(a) providing a seal of monolithic construction having a generally ring-shaped body defining a dynamic sealing surface of generally circular configuration having a plurality of pressure manipulation features projecting therefrom;
(b) providing a relatively rotatable surface having at least one direction of relative rotation relative to said dynamic sealing surface;
(c) compressing said dynamic sealing surface and said plurality of pressure manipulation features against said relatively rotatable surface, wherein:
    (i) said dynamic sealing surface establishing sealing contact pressure with said relatively rotatable surface, thereby establishing a dynamic sealing interface between said dynamic sealing surface and said relatively rotatable surface;
    (ii) said plurality of pressure manipulating features collectively establishing at least one elevated contact pressure zone with said relatively rotatable surface being at a contact pressure that is higher than said sealing contact pressure; and
    (iii) said at least one elevated contact pressure zone being skewed with respect to said at least one direction of relative rotation.

30. A method for controlling lubricant movement across a dynamic sealing interface between a generally ring-shaped seal and a relatively rotatable surface, wherein the seal establishes a partition between a supply of lubricant and an environment and having a dynamic sealing surface establishing a dynamic sealing interface with the relatively rotatable surface and having a plurality of pressure manipulating features projecting from the dynamic sealing surface and being spaced to define lubricant paths across the dynamic sealing interface, said method comprising:
(a) with said plurality of pressure manipulating features, establishing a plurality of elevated contact pressure zones with said relatively rotatable surface and within said dynamic sealing interface; and
(b) with said elevated contact pressure zones, causing directionally controlled movement of lubricant from said supply of lubricant across said dynamic sealing interface and into the environment.

31. The method of claim 30, wherein the seal and the relatively rotatable surface establish at least one direction of relative rotation therebetween, said plurality of pressure manipulating features being disposed in skewed relation with respect to said at least one direction of relative rotation, said method comprising:

causing interaction of said plurality of pressure manipulating features with said lubricant within said dynamic sealing interface so that said skewed relation of said pressure manipulating features develops said directionally controlled movement of lubricant responsive to relative rotation of said generally ring-shaped seal and said relatively rotatable surface.

* * * * *